(12) United States Patent
Lee et al.

(10) Patent No.: US 10,444,878 B2
(45) Date of Patent: Oct. 15, 2019

(54) DISPLAY APPARATUS HAVING A CRACK RESISTANCE STRUCTURE

(71) Applicant: Samsung Display Co., Ltd., Yongin-si (KR)

(72) Inventors: Innam Lee, Yongin-si (KR); Jungmok Park, Hwaseong-si (KR); Heewoong Park, Hwaseong-si (KR); Kangwon Lee, Seoul (KR); Jeongheon Lee, Seongnam-si (KR); Hyunjae Lee, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 80 days.

(21) Appl. No.: 15/342,628

(22) Filed: Nov. 3, 2016

(65) Prior Publication Data
US 2017/0344162 A1    Nov. 30, 2017

(30) Foreign Application Priority Data
May 31, 2016  (KR) .................. 10-2016-0067717

(51) Int. Cl.
*G06F 3/041* (2006.01)
*G06F 3/044* (2006.01)

(52) U.S. Cl.
CPC ............ *G06F 3/0412* (2013.01); *G06F 3/041* (2013.01); *G06F 3/044* (2013.01)

(58) Field of Classification Search
CPC ........... G06F 3/044; G06F 2203/04111–04113
See application file for complete search history.

(56) References Cited

U.S. PATENT DOCUMENTS

| | | | |
|---|---|---|---|
| 2009/0213090 A1* | 8/2009 | Mamba | ................... G06F 3/044 345/174 |
| 2012/0200527 A1 | 8/2012 | Rumsby | |
| 2013/0050105 A1 | 2/2013 | Lee et al. | |
| 2013/0285938 A1 | 10/2013 | Kang et al. | |
| 2014/0048315 A1 | 2/2014 | Chae et al. | |
| 2014/0062909 A1 | 3/2014 | Choi et al. | |

(Continued)

FOREIGN PATENT DOCUMENTS

| | | |
|---|---|---|
| KR | 10-2012-0058535 | 6/2012 |
| KR | 10-2013-0021648 | 3/2013 |

(Continued)

*Primary Examiner* — Sanghyuk Park
(74) *Attorney, Agent, or Firm* — H.C. Park & Associates, PLC

(57) ABSTRACT

A display apparatus including a display panel, a polarizing member having an absorption axis and a transmission axis, and a first touch electrode extending in a first direction is disclosed. The first touch electrode includes first touch patterns and a connection pattern connecting adjacent first touch patterns in the first direction. The connection pattern has a minimum width in a direction perpendicular to a second direction. The first direction and the absorption axis direction form a first directional angle equal to or less than about 90 degrees. The first and second directions form a second directional angle equal to or less than about 90 degrees. The second and absorption axis directions form a third directional angle equal to or less than about 90 degrees. The first directional angle is the sum of the second directional angle and the third directional angle.

24 Claims, 15 Drawing Sheets

(56) References Cited

U.S. PATENT DOCUMENTS

| | | |
|---|---|---|
| 2014/0184936 A1 | 7/2014 | Oh et al. |
| 2015/0015498 A1 | 1/2015 | Wang et al. |
| 2015/0029143 A1 | 1/2015 | Kang et al. |
| 2015/0077651 A1* | 3/2015 | Yamagishi ............. G06F 3/044 349/12 |
| 2015/0083568 A1 | 3/2015 | Park et al. |
| 2015/0103273 A1* | 4/2015 | Jung ................... G06F 3/0412 349/12 |
| 2015/0109245 A1* | 4/2015 | Chou .................. G06F 3/044 345/174 |
| 2015/0185939 A1 | 7/2015 | Han et al. |
| 2015/0220190 A1* | 8/2015 | Yashiro ............... G06F 3/0412 345/174 |
| 2015/0227237 A1 | 8/2015 | Ono et al. |
| 2015/0346866 A1* | 12/2015 | Kusunoki ............ G06F 1/1652 345/174 |
| 2016/0011689 A1 | 1/2016 | Kim et al. |
| 2016/0034077 A1 | 2/2016 | Hsieh et al. |
| 2016/0041644 A1 | 2/2016 | Bae et al. |
| 2016/0132281 A1 | 5/2016 | Yamazaki et al. |
| 2017/0147133 A1* | 5/2017 | Choi ..................... G06F 3/0416 |

FOREIGN PATENT DOCUMENTS

| | | |
|---|---|---|
| KR | 10-1341030 | 12/2013 |
| KR | 10-2014-0023046 | 2/2014 |
| KR | 10-1368684 | 3/2014 |
| KR | 10-2014-0084880 | 7/2014 |
| KR | 10-1426077 | 8/2014 |
| KR | 10-2014-0131130 | 11/2014 |
| KR | 10-2015-0007919 | 1/2015 |
| KR | 10-1481978 | 1/2015 |
| KR | 10-2015-0012389 | 2/2015 |
| KR | 10-2015-0033463 | 4/2015 |
| KR | 10-2015-0077819 | 7/2015 |
| KR | 10-2015-0078332 | 7/2015 |
| KR | 10-2015-0087946 | 7/2015 |
| KR | 10-1586740 | 1/2016 |
| KR | 10-2016-0017830 | 2/2016 |

* cited by examiner

DISPLAY APPARATUS HAVING A CRACK RESISTANCE STRUCTURE

CROSS-REFERENCE TO RELATED APPLICATION

This application claims priority from and the benefit of Korean Patent Application No. 10-2016-0067717, filed on May 31, 2016, which is hereby incorporated by reference for all purposes as if fully set forth herein.

BACKGROUND

Field

Exemplary embodiments relate to a display apparatus and, more particularly, to a display apparatus that may reduce the likelihood and severity of cracks created in touch electrodes when they are bent.

Discussion of the Background

A touch sensing part is an input device to which a user inputs a command by touching the touch sensing part with the user's finger or a tool. Since the touch sensing part may obviate the need of a separate input device, such as a keyboard, a mouse, etc., the touch sensing part is generally used in mobile devices.

As the touch sensing part, a resistive type touch sensing part, a light sensing type touch sensing part, and a capacitive type touch sensing part are widely used. Among them, the capacitive type touch sensing part includes a plurality of touch electrodes, which may detect a touch position by sensing a position with a varied capacitance in accordance with the touch of the user's finger or the tool.

The touch electrodes included in the capacitive type touch sensing part may have various shapes. The shapes of the touch electrodes are generally designed to be less perceivable to a user.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display apparatus capable of reducing cracks in touch electrodes from bending the display apparatus.

Additional aspects will be set forth in the detailed description which follows, and, in part, will be apparent from the disclosure, or may be learned by practice of the inventive concept.

According to an exemplary embodiment, a display apparatus includes a display panel configured to display an image, a polarizing member disposed on the display panel and having an absorption axis and a transmission axis perpendicular to the absorption axis, and a first touch electrode disposed on the display panel and overlapping the polarizing member, the first touch electrode extending in a first direction crossing an absorption axis direction parallel to the absorption axis. The first touch electrode includes first touch patterns and a connection pattern connecting adjacent first touch patterns in the first direction. The connection pattern has a minimum width in a direction perpendicular to a second direction, the second direction crossing the first direction and the absorption axis direction. The first direction and the absorption axis direction form a first directional angle equal to or less than about 90 degrees. The first direction and the second direction form a second directional angle equal to or less than about 90 degrees. The second direction and the absorption axis direction form a third directional angle equal to or less than about 90 degrees. The first directional angle is the sum of the second directional angle and the third directional angle.

The display apparatus may further include a second touch electrode disposed on the display panel, the second touch electrode extending in a third direction perpendicular to the first direction and electrically insulated from the first touch electrode, in which the second touch electrode includes second touch patterns, and a bridge pattern connecting adjacent second touch patterns in the third direction.

The display apparatus may further include a protective layer disposed between the display panel and the first touch electrode, in which the first and second touch electrodes are disposed between the polarizing member and the protective layer.

The display apparatus may further include a protective layer disposed between the display panel and the first touch electrode, in which the polarizing member is disposed between the protective layer and the display panel.

The first directional angle may be about 45 degrees.

The display apparatus may further include a bending area, in which the display apparatus is configured to be bent in the bending area with respect to a reference axis substantially parallel to the third direction.

The bending area may be configured to be bent to have a convex shape.

A side of the first touch patterns and a side of the second touch patterns may each have a zigzag shape.

Edges of the zigzag shape may each have a curved shape.

The display apparatus may further include dummy patterns disposed between and electrically insulated from the first touch patterns and the second touch patterns, in which a portion of an edge of each of the dummy patterns has a curved shape.

According to an exemplary embodiment, a display apparatus includes a display panel configured to display an image, a polarizing member disposed on the display panel having an absorption axis and a transmission axis perpendicular to the absorption axis, and a touch electrode disposed on the display panel and overlapping the polarizing member. The touch electrode includes a bending area configured to be bent with respect to a reference axis perpendicular to a first direction. The touch electrode has a minimum width in a direction perpendicular to a second direction. The first direction, the second direction, and an absorption axis direction substantially parallel to the absorption axis cross each other. The first direction and the absorption axis direction form a first directional angle equal to or less than about 90 degrees. The first direction and the second direction form a second directional angle equal to or less than about 90 degrees. The second direction and the absorption axis direction form a third directional angle equal to or less than about 90 degrees. The first directional angle is the sum of the second directional angle and the third directional angle.

An angle between the first direction and the absorption axis direction in a counter-clockwise direction with respect to the first direction may be more than about 0 degrees and equal to or less than about 90 degrees, and an angle between the first direction and the second direction in the counter-clockwise direction may be less than the first directional angle.

An angle between the first direction and the absorption axis in the counter-clockwise direction may be of about 45 degrees.

An angle between the first direction and the absorption axis direction in a clockwise direction with respect to the first direction may be more than about 0 degrees and equal to or less than about 90 degrees, and an angle between the first direction and the second direction in the clockwise direction is less than the first directional angle.

An angle between the first direction and the absorption axis direction in the clockwise direction may be about 45 degrees.

According to an exemplary embodiment, a display apparatus includes a display panel configured to display an image, and a first touch electrode disposed on the display panel and extending in a first direction, in which the first touch electrode includes first touch patterns, and a connection pattern connecting adjacent first touch patterns in the first direction. The connection pattern has a minimum width in a direction perpendicular to a second direction crossing the first direction, and a portion of a side of the first touch electrode has a curved shape.

The display apparatus may further include a second touch electrode disposed on the display panel, the second touch electrode extending in a third direction perpendicular to the first direction and electrically insulated from the first touch electrode, in which the second touch electrode includes second touch patterns, and a bridge pattern connecting adjacent second touch patterns, and a portion of an edge of the second touch patterns has a curved shape.

The display apparatus may further include dummy patterns disposed between and electrically insulated from the first touch patterns and the second touch patterns, in which a portion of an edge of each of the dummy patterns has a curved shape.

A side of the first touch patterns and a side of the second touch patterns may each have a zigzag shape.

Edges of the zigzag shape may each have a minimum radius of curvature equal to or greater than about 0.1 mm.

According to an exemplary embodiment, a display apparatus includes a display panel configured to display an image, a first touch electrode disposed on the display panel, the first touch electrode including first touch patterns and a connection pattern connecting adjacent first touch patterns, in which the first touch patterns extend along a first direction, and the connection pattern extend along a second direction different from the first direction.

The display apparatus may further include a polarizing member disposed on the display panel, the polarizing member having an absorption axis and a transmission axis perpendicular to the absorption axis, in which the second direction is formed between the first direction and a direction of the absorption axis, when the first direction, the second direction, and the direction of the absorption axis are plotted in one quadrant to cross the same origin.

An acute angle between the first direction and the second direction is less than 45 degrees.

The display apparatus may be configured to be bent along a direction perpendicular to the first direction.

The first touch patterns may have a rhombus shape, and each side of the rhombus shape may have a zigzag shape having rounded corners.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
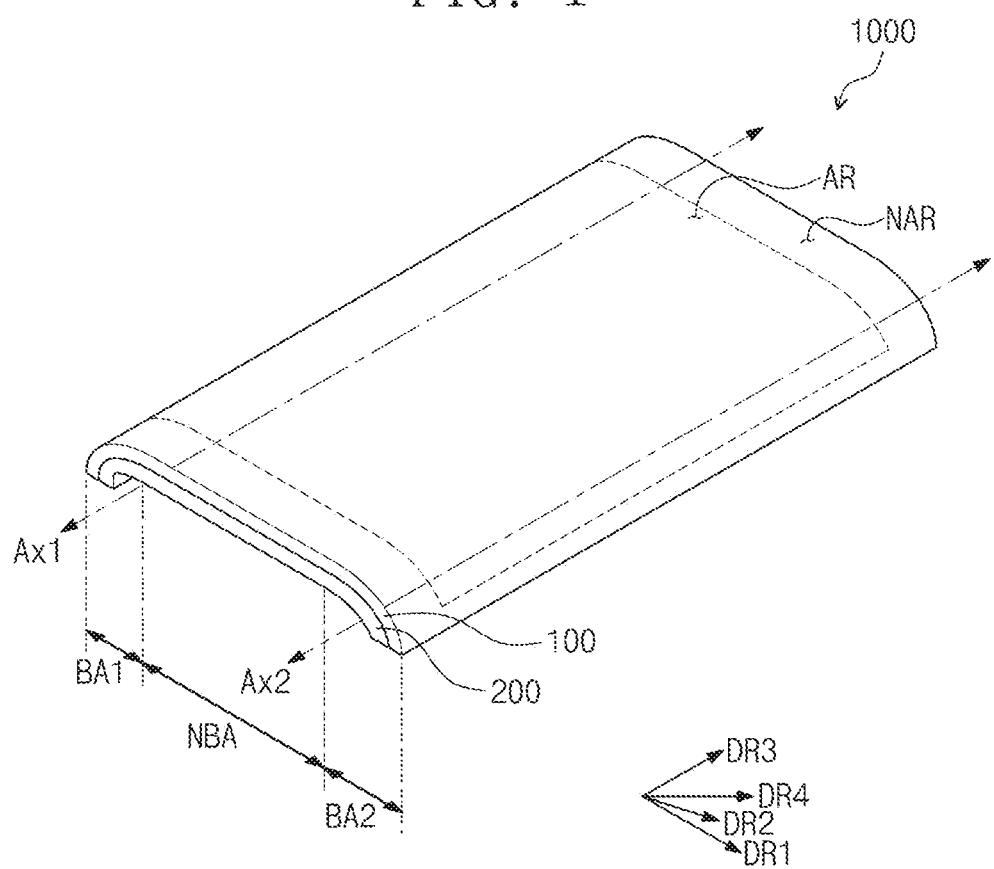
FIG. 1 is a perspective view showing a display apparatus according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a perspective view showing a display apparatus 1000 according to an exemplary embodiment. The display apparatus 1000 includes a touch sensing part 100 and a display panel 200. The touch sensing part 100 is disposed on the display panel 200.

Referring to FIG. 1, the display apparatus 1000 includes a first bending area BA1 bent with respect to a first reference axis Ax1 substantially parallel to a third direction DR3, a second bending area BA2 bent with respect to a second reference axis Ax2 substantially parallel to the third direction DR3, and a flat area NBA. The third direction DR3 is perpendicular to a first direction DR1. The first bending area BA1, the flat area NBA, and the second bending area BA2 of the display apparatus 1000 are sequentially arranged in the first direction DR1.

The display apparatus 1000 may be, but is not limited to, a curved display apparatus having a curvature. When the first bending area BA1 and the second bending area BA2 are bent, a stress may be applied to the first bending area BA1 and the second bending area BA2, but the stress may not be applied to the flat area NBA, since the flat area NBA is not bent. Although FIG. 1 shows that the display apparatus 1000 of FIG. 1 includes the flat area NBA, it is contemplated that, however, the display apparatus 1000 may alternatively be a curved display apparatus including the first and second bending areas BA1 and BA2 without the flat area NBA therebetween. In addition, in FIG. 1, the display apparatus 1000 is shown to be convex-curved to a direction to which an image is displayed. However, the display apparatus 1000 may alternatively be concave-curved with respect to the direction to which an image is displayed.

The display apparatus 1000 may be, but is not limited to, a flexible display apparatus that may be folded or unfolded. The display apparatus 1000 may be bent with respect to one reference axis. The display apparatus 1000 may alternatively be a flexible display apparatus that includes the first and second bending areas BA1 and BA2 without the flat area NBA therebetween.

When the display apparatus 1000 of FIG. 1 is flexible, the display apparatus 1000 may be in an out-folding state, such that the touch sensing part 100 is bent facing outward with respect to the first and second reference axes Ax1 and Ax2 substantially parallel to the third direction DR3, but it should not be limited thereto or thereby. According to an exemplary embodiment, the display apparatus 1000 may alternatively be in an in-folding state, such that the touch sensing part is bent facing inward with respect to the first and second reference axes Ax1 and Ax2.

The display apparatus 1000 may include an active area AR and a non-active area NAR surrounding the active area AR.

The active area AR may be, but is not limited to, an area where the touch sensing part 100 is activated. The active area AR may be an overlapping area between a display area, a portion of which the display panel 200 may be activated, and a touch area, a portion of which the touch sensing part 100 may be activated. Accordingly, a user may input a touch signal to the display apparatus 1000 and simultaneously receive information through the image displayed in the display area.

The touch sensing part 100 may not be activated in the non-active area NAR. The non-active area NAR includes wirings that may transmit electrical signals for activating the active area AR.

Figure 2:
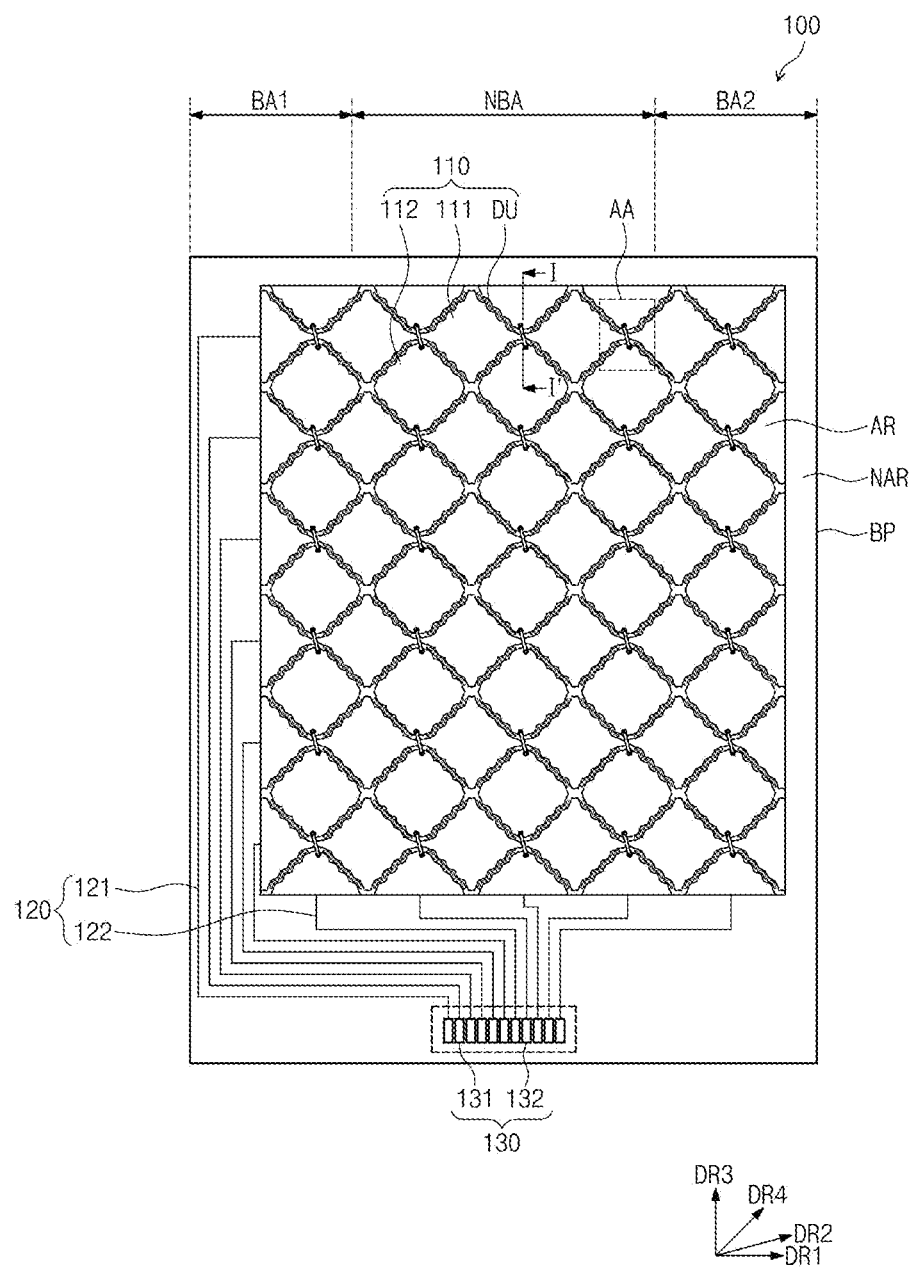
FIG. 2 is a plan view showing a touch sensing part according to an exemplary embodiment.
Figure 3:
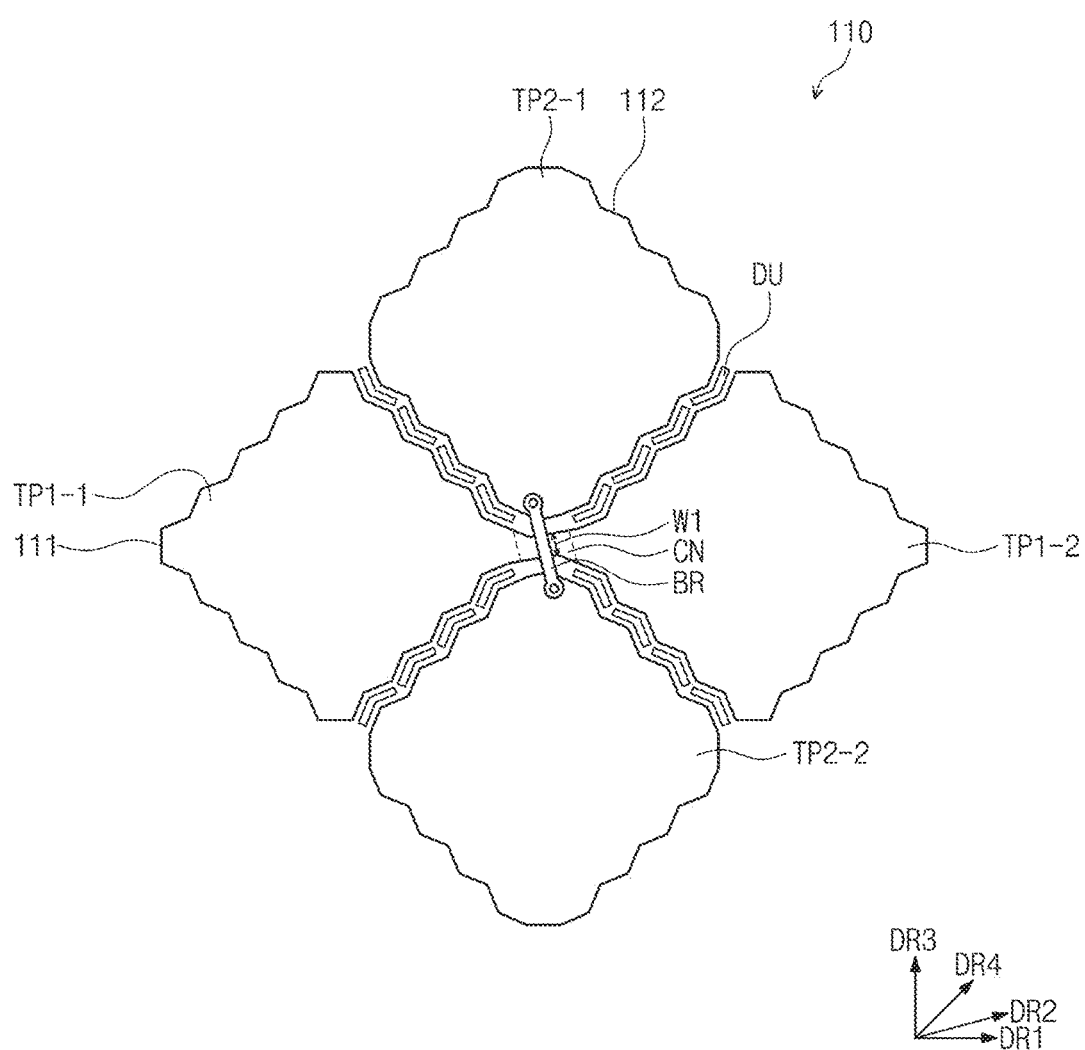
FIG. 3 is a plan view showing touch electrodes of FIG. 2.
Figure 4:
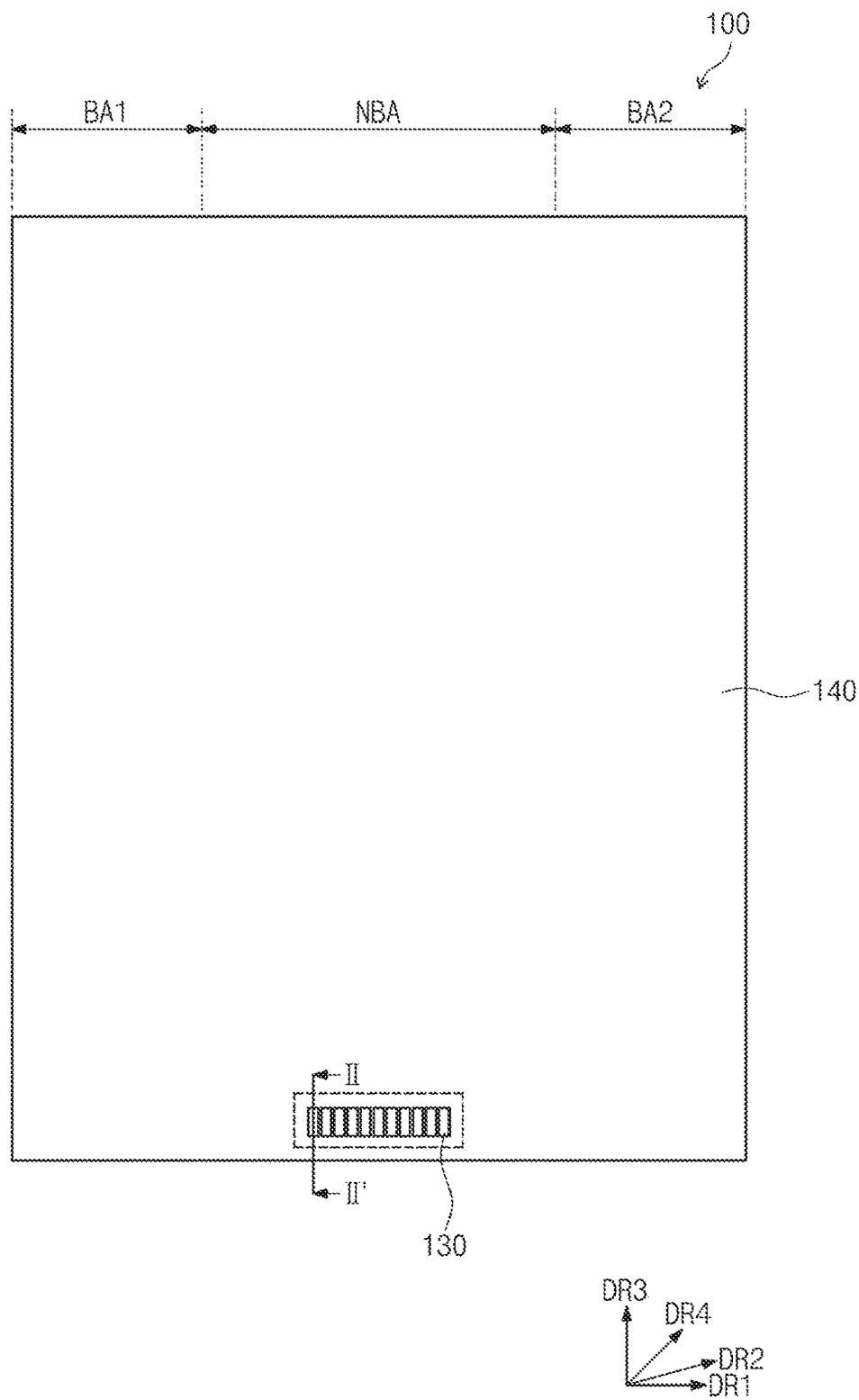
FIG. 4 is a plan view showing a touch sensing part according to an exemplary embodiment.

FIG. 2 is a plan view showing a touch sensing part 100 according to an exemplary embodiment. FIG. 3 is a plan view showing touch electrodes 110 of FIG. 2. FIG. 4 is a plan view showing a touch sensing part 100 according to an exemplary embodiment. FIG. 2 shows touch electrodes disposed on a base member BP, and FIG. 4 shows the touch sensing part 100 including an insulating layer 140 disposed on the touch electrodes 110.

Referring to FIG. 2, the touch sensing part 100 according to an exemplary embodiment includes touch electrodes 110, touch lines 120, and touch pads 130.

The touch electrodes 110 include first touch electrodes 111, second touch electrodes 112, and dummy patterns DU. The first touch electrodes 111 extend in the first direction DR1, and the second touch electrodes 112 extend in the third direction DR3 perpendicular to the first direction DR1.

The touch electrodes 110 may include a conductive material. For instance, the touch electrodes 110 may include a conductive oxide material, such as indium tin oxide (ITO), indium zinc oxide (IZO), indium gallium zinc oxide (IGZO), etc., but the touch electrodes 110 may alternatively include a metal or conductive polymer. The touch electrodes 110 may include a nanowire including Ag, Cu, Au, etc. The touch electrode 110 may have a mesh shape.

The first touch electrodes 111 are disposed on the display panel 200 (see FIG. 1). The first touch electrodes 111 include first touch patterns TP1 and connection patterns CN, which are further described below with reference to FIG. 3.

Referring to FIG. 3, the first touch patterns TP1 are spaced apart from each other in the first direction DR1. Each first touch pattern TP1 has a rhombus shape, but the shape of the first touch patterns TP1 may be varied. A side of each of the first touch patterns TP1 may have a zigzag shape. Accordingly, even though the display area is disposed to overlap the first touch patterns TP1, the image displayed on the display area may be less affected by the first touch patterns TP1. In detail, the zigzag shape in the first touch patterns TP1 may prevent the occurrence of a moiré phenomenon, which may be caused by the repeated arrangement of the first touch patterns TP1.

Each connection pattern CN connects two first touch patterns TP1-1 and TP1-2 adjacent to each other in the first direction DR1. The connection patterns CN extend in the second direction DR2 crossing the first direction DR1. Referring to FIG. 3, an extending direction of the first touch patterns TP1 is different from an extending direction of the connection patterns CN. The connection patterns CN have a minimum width W1 in a direction perpendicular to the second direction DR2. More particularly, the second direction DR2 is defined in a direction perpendicular to the minimum width W1. For example, the connection patterns CN may be defined by a length of about two and half times of the minimum width W1 and a width of the minimum width W1. However, the connection pattern CN may be defined in various ways.

The second touch electrodes 112 are disposed on the display panel 200 (see FIG. 1). The second touch electrodes 112 are electrically insulated from the first touch electrodes 111. The second touch electrodes 112 include second touch patterns TP2 and bridge patterns BR.

The second touch patterns TP2 are spaced apart from each other in the third direction DR3 perpendicular to the first direction DR1. Each second touch pattern TP2 has a rhombus shape, but the shape of the second touch patterns TP2 may be varied. A side of each of the second touch patterns TP2 may have a zigzag shape. The zigzag shape may prevent the occurrence of a moiré phenomenon, which may be caused by the repeated arrangement of the second touch patterns TP2.

Each bridge pattern BR connects two second touch patterns TP2-1 and TP2-2 adjacent to each other in the third direction DR3. The bridge patterns BR extend in a direction perpendicular to the second direction DR2, but it should not be limited thereto or thereby.

The second touch patterns TP2 may be disposed on the same layer as the first touch patterns TP1, and the bridge patterns BR may be disposed on the connection patterns CN. The bridge patterns BR may be electrically insulated from the connection patterns CN.

The dummy patterns DU may be electrically floated. The dummy patterns DU may prevent the patterns of the first touch electrodes 111 and the second touch electrodes 112 from being perceived by a user.

Referring back to FIG. 2, the touch lines 120 include first lines 121 and second lines 122. The touch lines 120 are disposed on the base member BP.

The first lines 121 are connected to the first touch electrodes 111. The first lines 121 may be disposed on the same layer as the first touch electrodes 111. The first lines 121 are arranged in the non-active area NAR of the display panel 200. One end of each of the first lines 121 is connected to one end of a corresponding first touch electrode of the first touch electrodes 111, and the other end of each of the first lines 121 is connected to a corresponding pad of the first pads 131.

The second lines 122 are connected to the second touch electrodes 112. The second lines 122 may be disposed on the same layer as the first touch electrodes 111. The second lines 122 are arranged in the non-active area NAR of the display panel 200. One end of each of the second lines 122 is connected to one end of a corresponding second touch electrode of the second touch electrodes 112, and the other end of each of the second lines 122 is connected to a corresponding pad of the second pads 132.

The touch pads 130 include first pads 131 and second pads 132. The touch pads 130 are disposed on the base member BP. The touch pads 130 may be disposed on the same layer as the first and second lines 121 and 122. The touch pads 130 are arranged in the non-active area NAR. The first pads 131 are connected to the first lines 121, and the second pads 132 are connected to the second lines 122.

The touch sensing part 100 calculates a touch coordinate through the first and second pads 131 and 132 based on a variation in capacitance of a capacitor between the first touch electrodes 111 and the second touch electrodes 112, in accordance with a touch event.

Referring to FIG. 4, the touch sensing part 100 further includes an insulating layer 140.

The insulating layer 140 is disposed on the display panel 200 (see FIG. 1). The insulating layer 140 is disposed on the first touch electrodes 111. In addition, the insulating layer 140 may be disposed on the touch lines 120 and the second touch patterns TP2, and cover the bridge patterns BR.

The insulating layer 140 may cover the entire surface of the display panel 200 except for a portion of the touch pads 130, but it should not be limited thereto or thereby. The insulating layer 140 may include various insulating materials, such as $SiO_x$, $SiN_x$, etc. The insulating layer 140 may be provided in a single-layer structure or a multi-layer structure.

Figure 5:
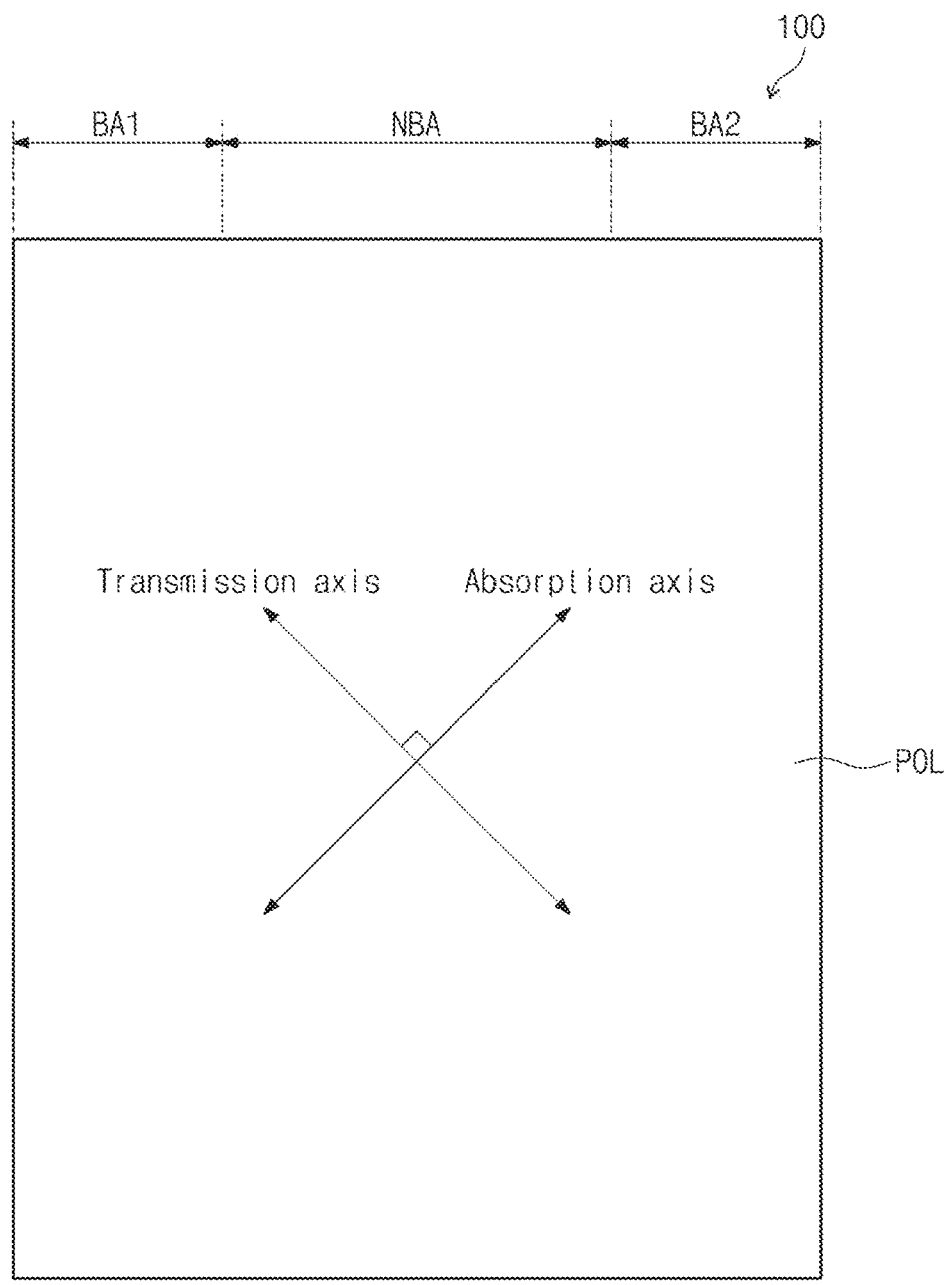
FIG. 5 is a plan view showing a polarizing member according to an exemplary embodiment.

FIG. 5 is a plan view showing a polarizing member POL according to an exemplary embodiment.

The polarizing member POL is disposed on the display panel 200 to prevent an external light from being reflected. The polarizing member POL may be disposed on the touch electrodes 110. The polarizing member POL may alternatively be disposed between the touch electrodes 110 and the display panel 200.

The polarizing member POL controls an amount of light transmitted thereby based on a polarization degree of light incident thereto. The polarizing member POL has an absorption axis and a transmission axis. The absorption axis is substantially perpendicular to the transmission axis. The polarizing member POL transmits light traveling in a direction substantially parallel to the transmission axis. The polarizing member POL absorbs light traveling in a direction substantially parallel to the absorption axis. The display apparatus 1000 may have a different color scheme depending on the absorption axis direction when the display apparatus 1000 is in an off state.

Referring to FIG. 5, a direction substantially parallel to the absorption axis of the polarizing member POL will be hereinafter referred to as a fourth direction DR4. The polarizing member POL is formed by elongating polymer films. In this case, the molecular arrangement of the polarizing member POL has a directional characteristic in the elongated direction (e.g., the absorption axis direction). More particularly, since polymers are aligned in the fourth direction DR4, an adhesive force between the polymers in the transmission axis perpendicular to the fourth direction DR4 is weaker than that between the polymers in the absorption axis. A length of the polarizing member POL in the transmission axis direction may be easily longer than a length of the polarizing member POL in the absorption axis direction by heat or pressure. In detail, in a high temperature or a high humidity environment, the polarizing member POL may shrink in the absorption axis direction. In the case that a shrink force occurs on the polarizing member POL in the fourth direction DR4, an expansive force may occur in the direction perpendicular to the fourth direction DR4 for maintaining the internal balance of the polarizing member POL.

The first to fourth directions DR1 to DR4 cross each other in different directions to prevent the touch electrodes 110 from being susceptible to cracking when the display apparatus 1000 is bent. Relations between the first to fourth directions DR1 to DR4 are described in detail later.

Figure 6:
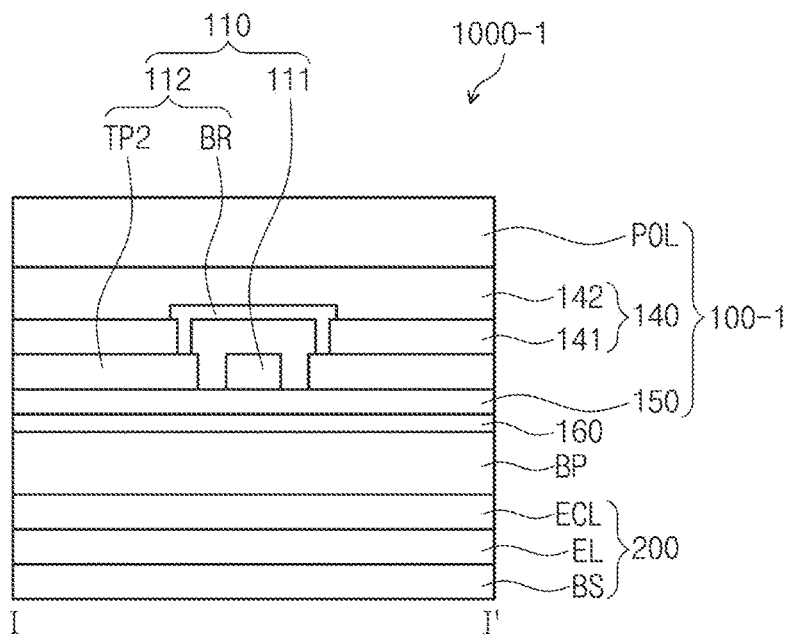
FIG. 6, FIG. 7, FIG. 8, FIG. 9, and FIG. 10 are cross-sectional views taken along line I-I' of FIG. 2.
Figure 7:
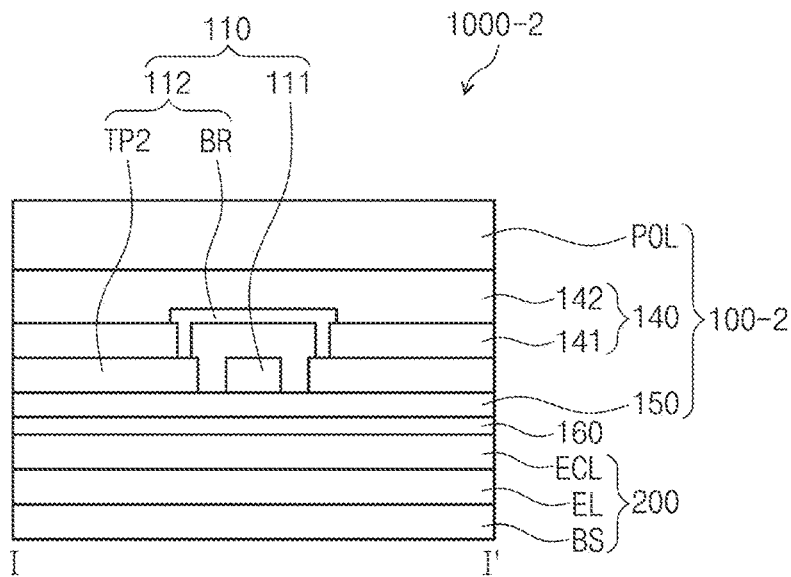
Figure 8:
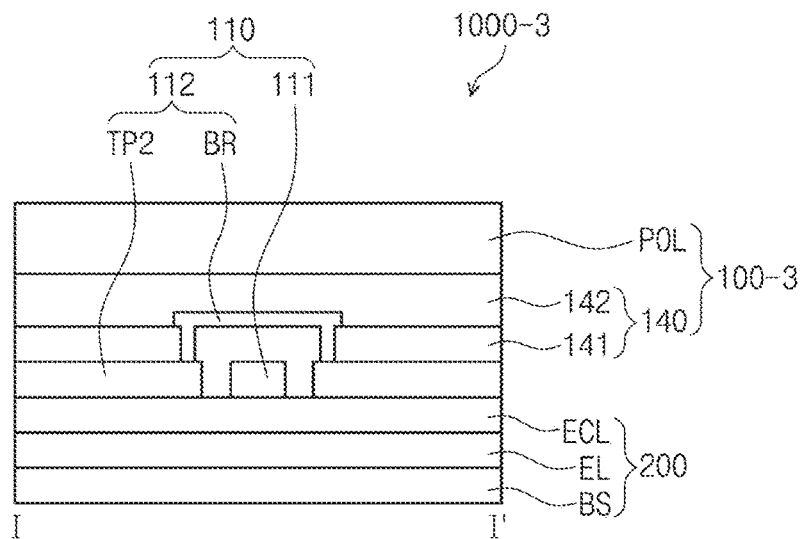
Figure 9:
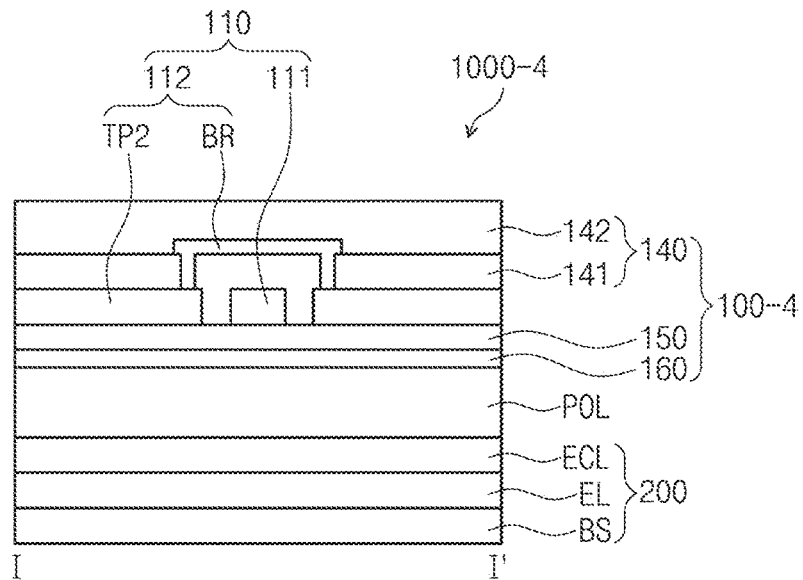
Figure 10:
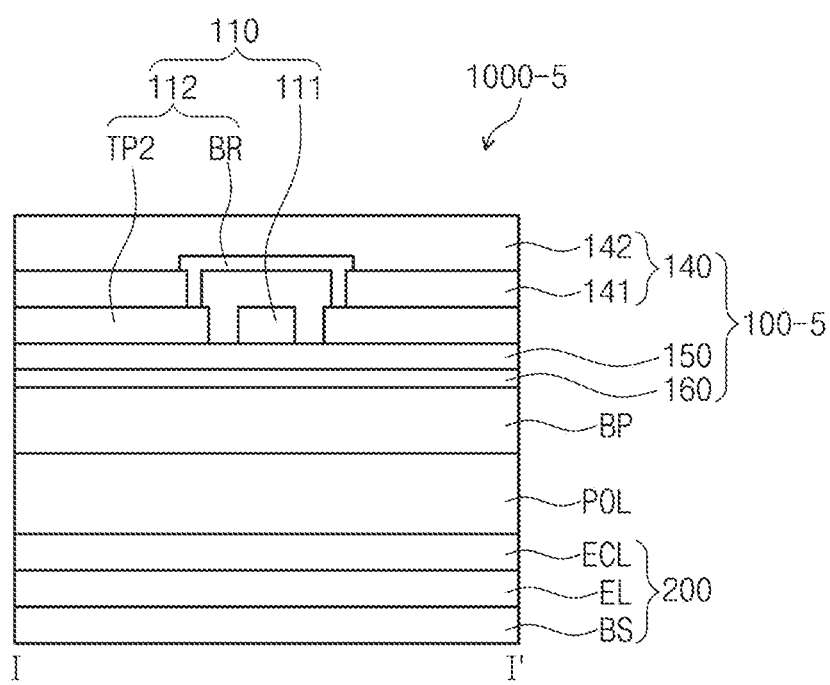

FIGS. 6 to 10 are cross-sectional views taken along line I-I' of FIG. 2, which respectively illustrate display apparatuses 1000-1 to 1000-5. FIGS. 6 to 8 are cross-sectional views showing the display apparatuses 1000-1 to 1000-3 each having a polarizing member POL disposed on the touch electrodes 110. FIGS. 9 and 10 are cross-sectional views showing the display apparatuses 1000-4 and 1000-5 each having a polarizing member POL disposed between touch electrodes 110 and a display panel 200.

Referring to FIG. 6, the display apparatus 1000-1 includes a touch sensing part 100-1, a display panel 200, and a base member BP. The touch sensing part 100-1 is disposed on the display panel 200. The base member BP is disposed between the touch sensing part 100-1 and the display panel 200.

The touch sensing part 100-1 includes the touch electrodes 110, an insulating layer 140, and a protective layer 150. The insulating layer 140 includes a first insulating layer 141 and a second insulating layer 142. The protective layer 150 is disposed on the base member BP, and the touch electrodes 110 and the insulating layer 140 are disposed on the protective layer 150. The polarizing member POL is disposed on the insulating layer 140.

Referring to FIGS. 6 and 7, in the touch sensing parts 100-1 and 100-2 according to exemplary embodiments, the protective layer 150 is formed on a base (not shown), and the touch electrodes 110, the insulating layer 140, and the polarizing member POL are formed on the protective layer 150. Then, the protective layer 150 is separated from the base (not shown). FIG. 6 shows the protective layer 150 attached to the base member BP by an adhesive 160 therebetween, and FIG. 7 shows the protective layer 150 attached to the display panel 200 by the adhesive 160.

According to the touch sensing parts 100-1 and 100-2, the first touch electrodes 111 and second touch patterns TP2 may be formed on the protective layer 150, and the first insulating layer 141 may be formed on the first touch electrodes 111 and second touch patterns TP2. Then, a contact hole may be formed in a portion where the first insulating layer 141 overlaps the second touch patterns TP2. Bridge patterns BR may be formed on the first insulating layer 141 and in the contact hole and connect two second touch patterns TP2 adjacent to each other. The second insulating layer 142 may be formed on the bridge patterns BR and the first insulating layer 141. The polarizing member POL may be attached to the second insulating layer 142 after forming the second insulating layer 142.

The first and second insulating layers 141 and 142 may include various materials, such as $SiO_x$, $SiN_x$, etc., and may share the same materials. The insulating layer 140 may have a thickness in a range of about 100 nm to about 10 μm.

The protective layer 150 may include various polymer organic layers, such as polyethylene etherphthalate, polyethylene naphthalate, polycarbonate, polyarylate, polyetherimide, polyethersulfone, polyimide, etc., but it should not be limited thereto or thereby. For instance, the protective layer 150 may be formed of an inorganic layer. The protective layer 150 may have a thickness in a range of about 100 nm to about 10 μm.

The protective layer 150 separated from the base (not shown) is attached to the base member BP to insulate the touch electrodes 110 from the display panel 200, and to protect the touch electrodes 110 from external impacts.

The base member BP may include a transparent insulating material, e.g., glass, polymer resin, etc., and may include the same material as that of the protective layer 150. For example, the base member BP may have a film shape including an organic material or an inorganic material. The base member BP may include a flexible material that is easily bent or folded.

Referring to FIG. 6, the touch sensing part 100-1 and the base member BP are attached to each other by the adhesive 160. The adhesive 160 may be, but is not limited to, a transparent adhesive film or a liquid adhesive, such as an optically clear resin.

The display panel 200 displays an image in response to image data provided thereto. The display panel 200 may be an organic light emitting display panel, an electrophoretic display panel, an electrowetting display panel, or a liquid crystal display panel, but is not limited thereto or thereby. Hereinafter, the display panel 200 will be described with reference to an organic light emitting display panel.

The display panel 200 includes a substrate BS, a pixel layer EL, and an encapsulation layer ECL.

The substrate BS may be, but is not limited to, a flexible substrate, and may include a plastic material having superior thermal resistance and durability, e.g., polyethylene terephthalate (PET), polyethylene naphthalate (PEN), polycarbonate (PC), polyarylate (PAR), polyetherimide (PEI), polyethersulfone (PES), polyimide (PI), etc., but the substrate BS may alternatively include various other materials, such as metal, glass, etc.

The pixel layer EL is disposed between the substrate BS and the encapsulation layer ECL. The pixel layer EL includes organic light emitting diodes (not shown) and driving devices (not shown) driving the organic light emitting diodes. The driving devices (not shown) include thin-film transistors and various lines. Each organic light emitting diode (not shown) includes an anode, an organic light emitting layer, and a cathode. Holes and electrons are injected into the organic light emitting layer from the anode and the cathode, and the holes are recombined with the electrons in the organic light emitting layer to generate excitons. The excitons may be shifted from an excited state to a ground state, and discharges energy during the shift, which is emitted as light.

The encapsulation layer ECL is disposed on the pixel layer EL. The encapsulation layer ECL prevents the organic light emitting diodes included in the pixel layer EL from being exposed to external moisture and oxygen. The encapsulation layer ECL may have a film shape, in which an organic layer and an inorganic layer are stacked one on another, however, the encapsulation layer ECL may be provided in a substrate of glass or plastic.

Referring to FIG. 7, the touch sensing part 100-2 may be directly attached to the display panel 200. In detail, the protective layer 150 may be directly attached to the encapsulation layer ECL of the display panel 200. In this case, the thickness of the display apparatus 1000-2 may be reduced, and thus, the display apparatus 1000-2 may be easily bent or folded. Other components of the display apparatus 1000-2 may have the same structure and function as those of the display apparatus 1000-1 shown in FIG. 6.

Referring to FIG. 8, the touch sensing part 100-3 includes touch electrodes 110 and an insulating layer 140. The insulating layer 140 includes a first insulating layer 141 and a second insulating layer 142. The touch electrodes 110 and the insulating layer 140 are directly disposed on the display panel 200 without the protective layer 150 therebetween.

In detail, the touch electrodes 110 and the insulating layer 140 may be directly formed on the encapsulation layer ECL without the protective layer 150 and the adhesive 160. The encapsulation layer ECL may include substantially the same material as the protective layer 150 described with reference to FIGS. 6 and 7.

Referring to FIGS. 9 and 10, a polarizing member POL is disposed between a protective layer 150 and a display panel 200. According to the display apparatus 1000-4 shown in FIG. 9, the polarizing member POL is attached to the encapsulation layer ECL, and the polarizing member POL and the protective layer 150 are attached to each other by the adhesive 160 therebetween. According to the display apparatus 1000-5 shown in FIG. 10, a base member BP is disposed on the polarizing member POL, and the base member BP and the protective layer 150 are attached to each other by the adhesive 160 therebetween.

Figure 11:
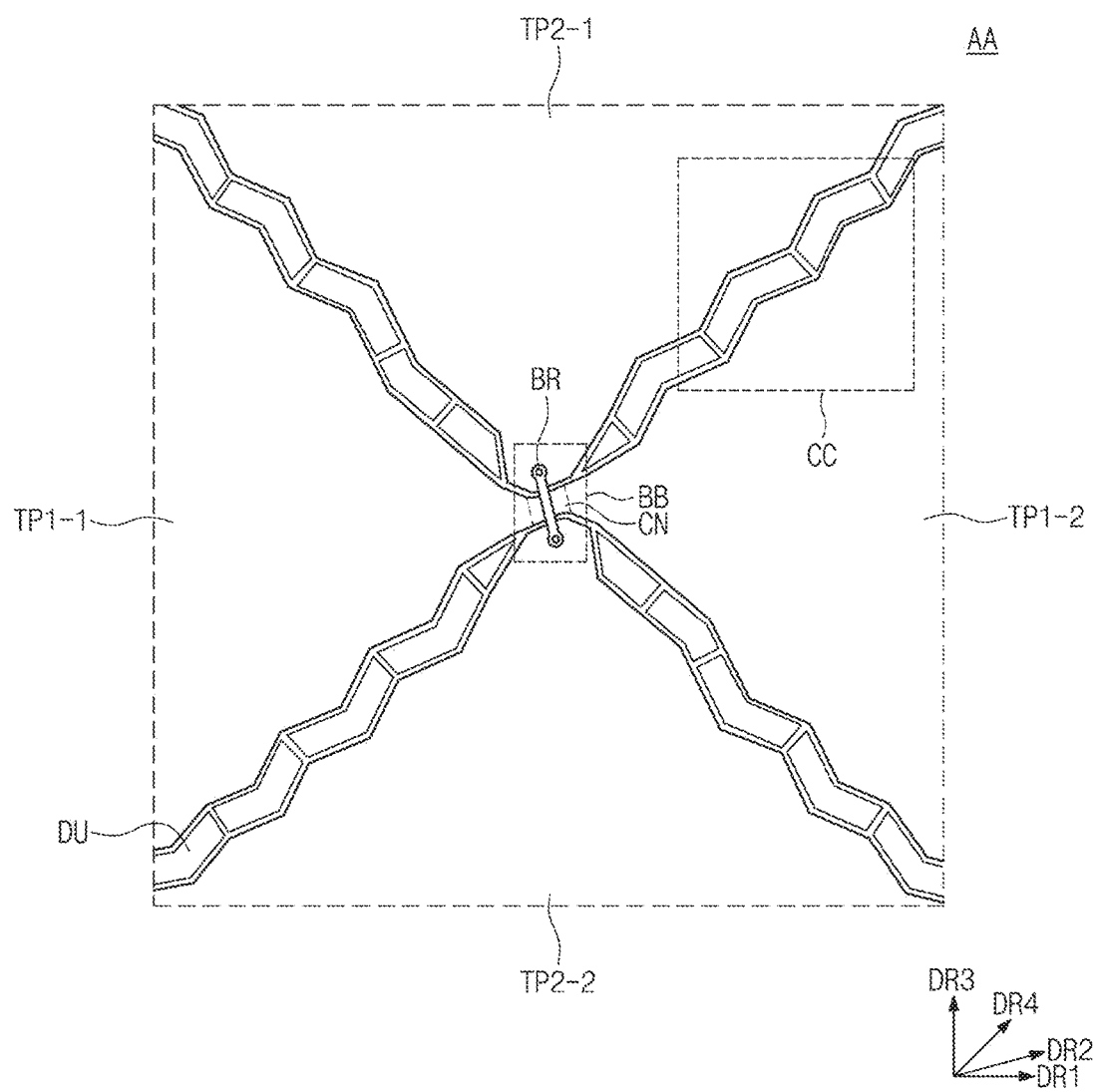
FIG. 11 is an enlarged plan view showing portion "AA" of a touch sensing part of FIG. 2 according to an exemplary embodiment.
Figure 12:
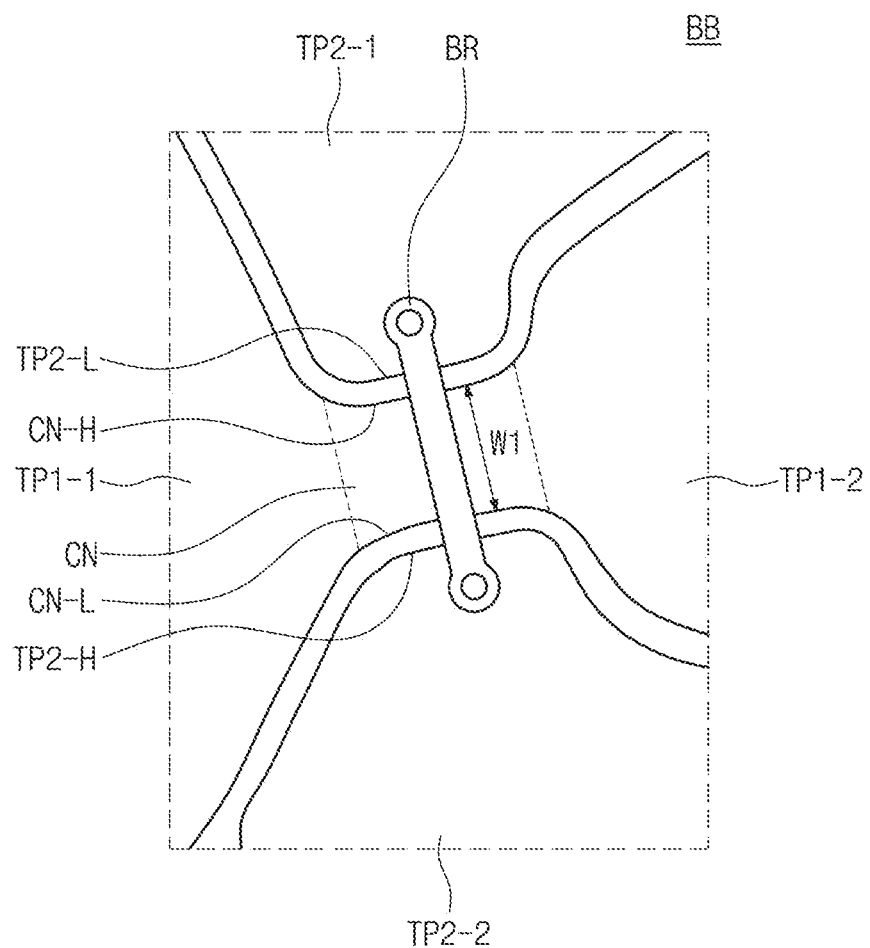
FIG. 12 is an enlarged plan view showing portion "BB" of a touch sensing part of FIG. 11 according to an exemplary embodiment.

FIG. 11 is an enlarged plan view showing portion "AA" of a touch sensing part 100 of FIG. 2 according to an exemplary embodiment. FIG. 12 is an enlarged plan view showing portion "BB" of a touch sensing part 100 of FIG. 11 according to an exemplary embodiment.

Referring to FIG. 11, the first touch patterns TP1-1 and TP1-2 extend in the first direction DR1, and the second touch patterns TP2-1 and TP2-2 extend in the third direction DR3. Sides of the first touch patterns TP1-1 and TP1-2 and sides of the second touch patterns TP2-1 and TP2-2 have a zigzag shape. The dummy patterns DU may be disposed between the first touch patterns TP1-1 and TP1-2 and the second touch patterns TP2-1 and TP2-2, and have a zigzag shape corresponding to the edges of the first touch patterns TP1-1 and TP1-2 and the second touch patterns TP2-1 and TP2-2.

Referring to FIG. 12, each connection pattern CN connects adjacent first touch patterns TP1-1 and TP1-2 in the first direction DR1. The connection patterns CN extend in the second direction DR2 crossing the first direction DR1 to connect the first touch patterns TP1-1 and TP1-2. In detail, the connection patterns CN have the minimum width W1 in a direction perpendicular to the second direction DR2.

In FIG. 12, the second touch pattern TP2-1 disposed at an upper side includes a first side TP2-L extending at a low-ermost end thereof, in plan view. The second touch pattern TP2-2 disposed at a lower side includes a second side TP2-H extending at an uppermost end thereof, in plan view. The connection pattern CN includes an upper side CN—H disposed at a lower side of the first side TP2-L opposing the first side TP2-L. The connection pattern CN includes a lower side CN-L disposed at an upper side of the second side TP2-H opposing the second side TP2-H. The connection pattern CN is disposed between the first side TP2-L and the second side TP2-H. The minimum width W1 may be substantially equal to a distance between the upper side CN—H and the lower side CN-L.

According to an exemplary embodiment, the connection patterns CN may have a minimum width W1 in more than one direction. That is, unlike the connection patterns CN illustrated with reference to FIGS. 11 and 12, the connection patterns CN may have a minimum width W1 not only in the direction perpendicular to the second direction DR2, but also in a direction perpendicular to another direction. In this case, another direction other than the second direction DR2 may be equated with the second direction DR2 described later, and thus, may be provided to meet a relation with the first and third directions DR1 and DR3 in the following description.

Figure 13A:
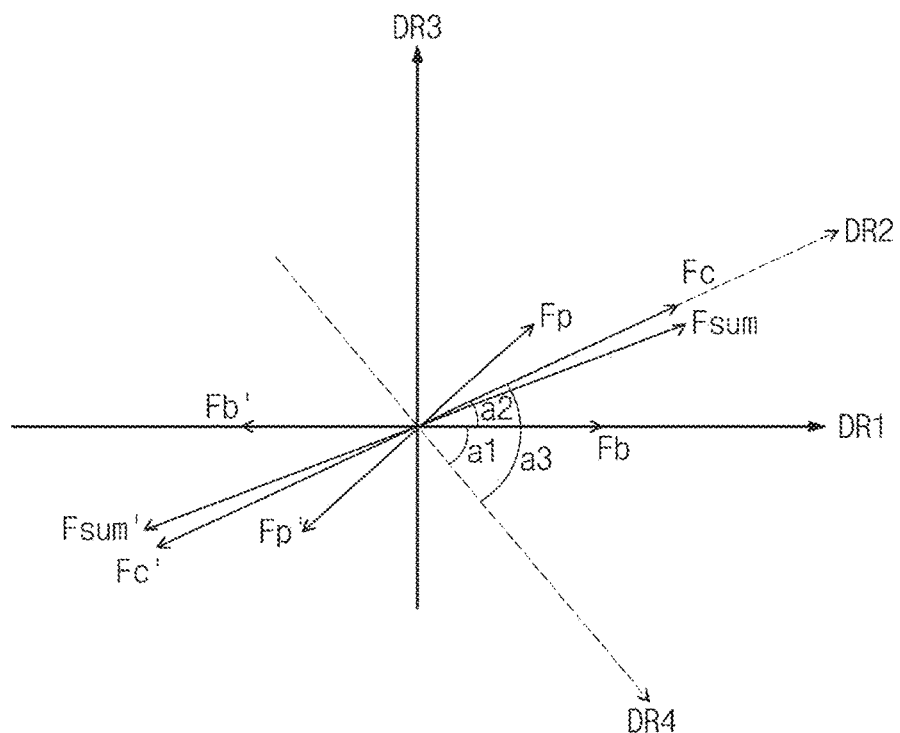
FIG. 13A, FIG. 13B, FIG. 13C, and FIG. 13D are graphs showing a force applied to connection patterns.
Figure 13B:
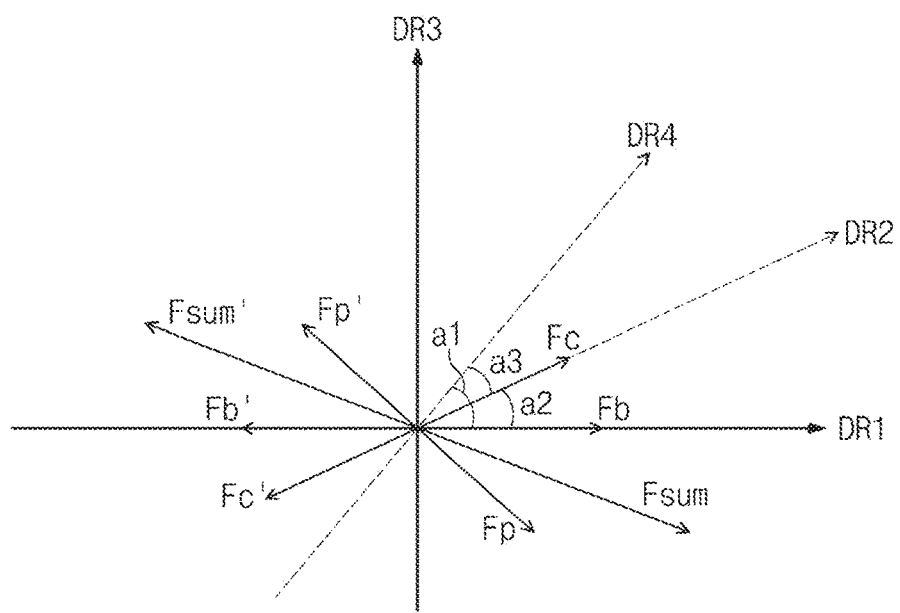
Figure 13C:
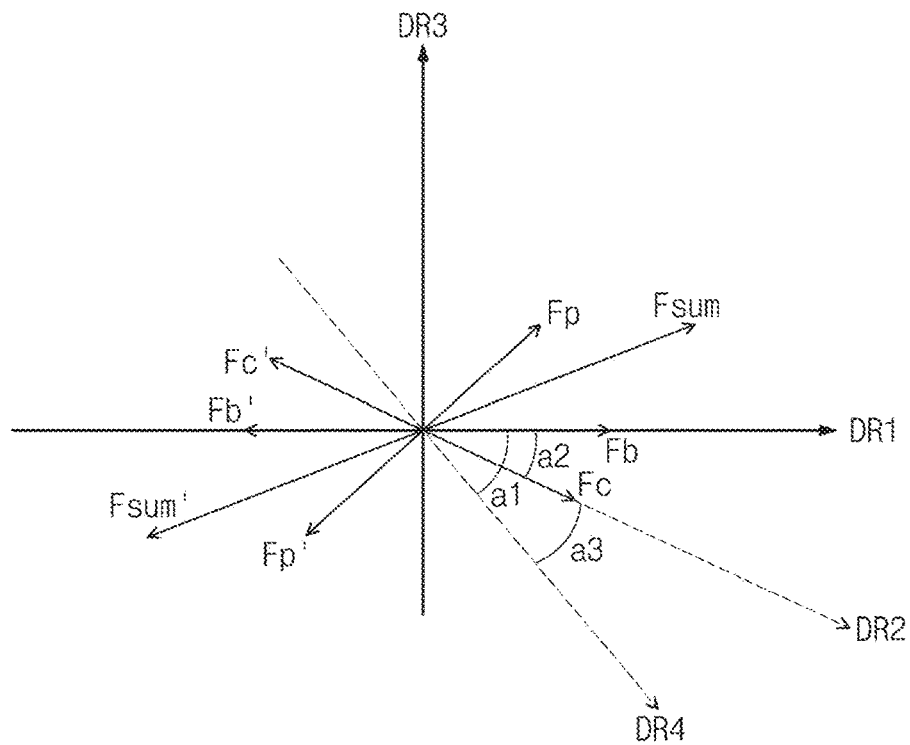
Figure 13D:
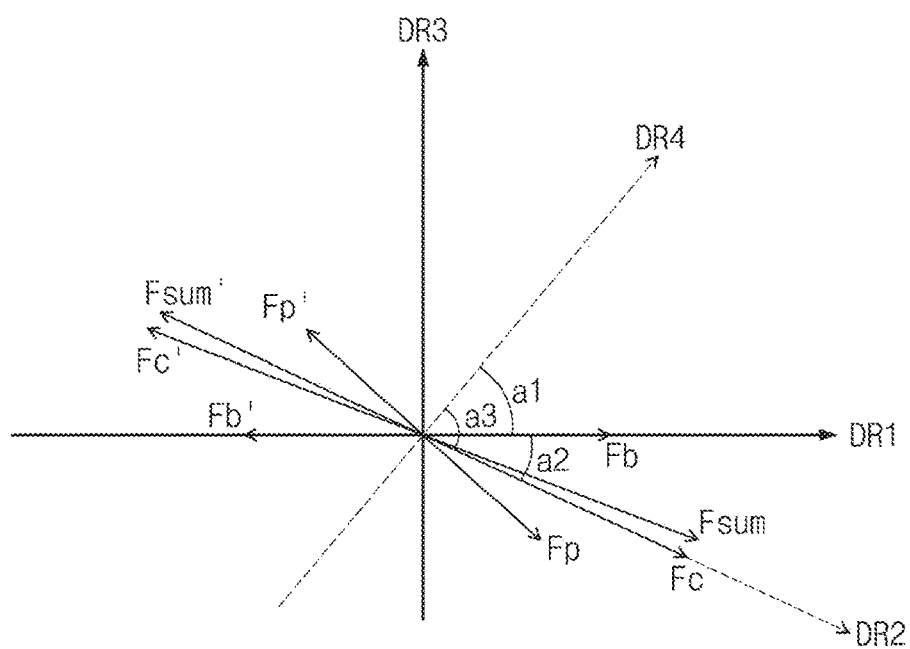

FIGS. 13A to 13D are graphs showing a force applied to the connection patterns CN according to the first to fourth directions DR1 to DR4. FIGS. 13A and 13D show a force applied to comparative embodiments, and FIGS. 13B and 13C show a force applied to exemplary embodiment that may reduce cracking.

The first direction DR1 corresponds to the bending direction of the display apparatus 1000 and corresponds to a direction to which a tensile force Fb is applied to the first touch electrodes 111, when the display apparatus 1000 is outwardly folded as shown in FIG. 1. When the display apparatus 1000 is inwardly folded, a compressive force occurs on the first touch electrodes 111. When the touch electrodes 110 includes a conductive oxide, e.g., indium tin oxide, a tensile strength of the touch electrodes 110 is low, and thus, the tensile force Fb may have a greater influence on the crack than the compressive force. The tensile force Fb may be applied to the display apparatus 1000 in the first direction DR1 by the out-folding of the display apparatus 1000.

The second direction DR2 corresponds to the extension direction of the connection patterns CN. Since the touch electrodes 110 includes the connection patterns CN that have the minimum width W1, the connection patterns CN are vulnerable to cracks as compared to the first touch patterns TP1 and the second touch patterns TP2. A tensile force Fc (hereinafter, referred to as a "connection pattern tensile force") applied in the second direction DR2 may have the greatest influence on the occurrence of the cracking on the connection pattern CN.

The third direction DR3 is perpendicular to the first direction DR1. The touch electrodes 110 may be bent with respect to a reference axis substantially parallel to the third direction DR3.

The fourth direction DR4 is substantially parallel to the absorption axis of the polarizing member POL. As described above, the adhesive force between molecules is relatively weak in the direction perpendicular to the absorption axis of the polarizing member POL. In a high temperature or a high humidity environment, a shrink force may occur on the polarizing member POL. In a high temperature or a high humidity, the polarizing member POL may have high shrinkage in the absorption axis direction. More particularly, a shrink force may occur on the polarizing member POL in the fourth direction DR4 when the display apparatus 1000 is manufactured or operated in a high temperature or a high humidity. An expansive force Fp occurs on the polarizing member POL in a direction perpendicular to the fourth direction DR4 based on the internal balance of the polarizing member POL corresponding to the shrink force in the fourth direction DR4.

Referring to FIGS. 13A to 13D, a first directional angle a1, a second directional angle a2, and a third directional angle a3 are defined as follows.

The first directional angle a1 represents an angle between the first direction DR1 and the fourth direction DR4. The tensile force Fb caused by the bending may be applied to opposite directions with respect to a reference point, and the extension direction of the absorption axis may be opposite directions substantially parallel to the absorption axis. An angle between two straight lines may be defined as an acute angle or an obtuse angle as long as the two straight lines are not perpendicular or parallel to each other. Herein, the first directional angle a1 corresponds to the acute angle between the first direction DR1 and the fourth direction DR4 as the two straight lines thereof are not perpendicular or parallel to each other. That is, the first directional angle a1 is less than 90 degrees. In FIGS. 13A to 13D, the first directional angle a1 is about 45 degrees.

The second directional angle a2 may be referred to as an angle between the first direction DR1 and the second direction DR2. A direction perpendicular to the minimum width W1 may be an opposite direction substantially parallel to a reference axis, which is perpendicular to the minimum width W1. The second directional angle a2 corresponds to the acute angle between the first direction DR1 and the second direction DR2. That is, the second directional angle a2 is less than 90 degrees.

The third directional angle a3 may be an angle between the second direction DR2 and the fourth direction DR4. The third directional angle a3 corresponds to the acute angle between the second direction DR2 and the fourth direction DR4. That is, the third directional angle a3 is less than 90 degrees.

In the graphs shown in FIGS. 13A to 13D, the first direction DR1 corresponds to a horizontal axis, and the third direction DR3 corresponds to a vertical axis. As used herein, a point where the horizontal axis meets the vertical axis is referred to as an "origin point". In general, bending may cause the tensile force Fb and the expansive force Fp of the polarizing member be each applied in opposite directions with respect to the origin point. Since the force applied to the connection patterns CN is substantially point-symmetrical with respect to the origin point, the magnitude of the forces and directions thereof applied to Quadrant 1 and Quadrant 4 are substantially the same as those applied to Quadrant 3 and Quadrant 2. Accordingly, hereinafter, the forces applied to Quadrant 1 and Quadrant 4 will be mainly described.

The force applied to the connection patterns CN may be the tensile force Fb caused by the bending and the expansive force Fp of the polarizing member. The connection pattern tensile force Fc may be obtained by determining a resultant force Fsum of the tensile force Fb and the expansive force Fp, and then extracting a vector component with respect to the second direction DR2, to which the connection patterns CN extend, from the resultant force Fsum.

Referring to FIG. 13A, according to a comparative embodiment, when the first direction DR1 corresponding to the bending direction of the display apparatus 1000 is defined as the horizontal axis, the fourth direction DR4 is defined in Quadrant 4, and the second direction DR2 is defined in Quadrant 1. The first directional angle a1 is about 45 degrees, and the second directional angle a2 may be more than 0 degrees and less than 45 degrees.

A direction to which the expansive force Fp is applied and the second direction DR2 are defined in Quadrant 1. A vector direction of the resultant force Fsum is defined in Quadrant 1. In this case, a difference in the angle between the direction of the resultant force Fsum and the extension direction DR2 of the connection patterns CN becomes relatively small, and a second direction component of the resultant force Fsum may become relatively large. That is, as the connection pattern tensile force Fc increases, the connection patterns CN may be vulnerable to crack.

Referring to FIG. 13B, according to an exemplary embodiment, when the first direction DR1 corresponding to the bending direction of the display apparatus 1000 is defined as the horizontal axis, the second and fourth directions DR2 and DR4 are defined in Quadrant 1. The first directional angle a1 is about 45 degrees, and the second directional angle a2 may be more than 0 degrees and less than 45 degrees.

The direction to which the expansive force Fp of the polarizing member is applied to is defined in Quadrant 4, and the second direction DR2 is defined in Quadrant 1. The vector direction of the resultant force Fsum is defined in Quadrant 4. In this case, the difference in angle between the direction of the resultant force Fsum and the extension direction DR2 of the connection patterns CN becomes relatively large, and the second direction component of the resultant force Fsum may become relatively small. That is, as the connection pattern tensile force Fc is reduced, the occurrence of cracking in the connection patterns CN may be reduced.

When the second directional angle a2 is defined between about 45 degrees and about 90 degrees, the connection patterns CN are less affected by the tensile force Fb. However, the connection patterns CN may be greatly affected by an expansive force Fp' of the polarizing member, which is applied to a direction of Quadrant 2.

Referring to FIG. 13C, according to an exemplary embodiment, when the first direction DR1 corresponding to the bending direction of the display apparatus 1000 is defined as the horizontal axis, the second and fourth directions DR2 and DR4 are defined in Quadrant 4. The first directional angle a1 is about 45 degrees, and the second directional angle a2 may be more than 0 degrees and less than 45 degrees.

The direction to which the expansive force Fp of the polarizing member is applied is defined in Quadrant 1, and the second direction DR2 is defined in Quadrant 4. The vector direction of the resultant force Fsum is defined in Quadrant 1. In this case, the difference in the angle between the direction of the resultant force Fsum and the extension direction DR2 of the connection patterns CN becomes relatively large, and the second direction component of the resultant force Fsum may become relatively small. That is, as the connection pattern tensile force Fc is reduced, the occurrence of cracking in the connection patterns CN may be reduced.

In the case that the second directional angle a2 is defined between about 45 degrees and about 90 degrees, the connection patterns CN are less affected by the tensile force Fb. However, the connection patterns CN may be greatly affected by the expansive force Fp' of the polarizing member, which is applied to the direction of Quadrant 2.

Referring to FIG. 13D, according to a comparative embodiment, when the first direction DR1 corresponding to the bending direction of the display apparatus 1000 is defined as the horizontal axis, the fourth direction DR4 is defined in Quadrant 1, and the second direction DR2 is defined in Quadrant 4. The first directional angle a1 is about 45 degrees, and the second directional angle a2 may be more than 0 degrees and less than 45 degrees.

The direction to which the expansive force Fp of the polarizing member is applied and the second direction DR2 are defined in Quadrant 4. The vector direction of the resultant force Fsum is defined in Quadrant 4. In this case, the difference in angle between the direction of the resultant force Fsum and the extension direction of the connection patterns CN becomes relatively small, and the second direction component of the resultant force Fsum may become relatively large. That is, as the connection pattern tensile force Fc may be relatively increased, the connection patterns CN may be vulnerable to the crack.

As lower connection pattern tensile force Fc may prevent or reduce the occurrence of cracking, the touch electrodes 110 and the polarizing member POL illustrated with reference to FIGS. 13B and 13C may prevent or reduce the occurrence of crack. When the absorption axis of the polarizing member POL is defined at about 45 degrees from the first direction DR1 in a clockwise direction, the second direction DR2 corresponding to the extension direction of the connection patterns CN may be defined more than 0 degree and equal to or less than about 45 degrees from the first direction DR1 along the clockwise direction. When the absorption axis of the polarizing member POL is defined at about 45 degrees from the first direction DR1 in a counter clockwise direction, the second direction DR2 corresponding to the extension direction of the connection patterns CN may be defined more than 0 degree and equal to or less than about 45 degrees from the first direction DR1 along the counter-clockwise direction. That is, the first directional angle a1 may be defined to correspond to a sum of the second directional angle a2 and the third directional angle a3.

Figure 14:
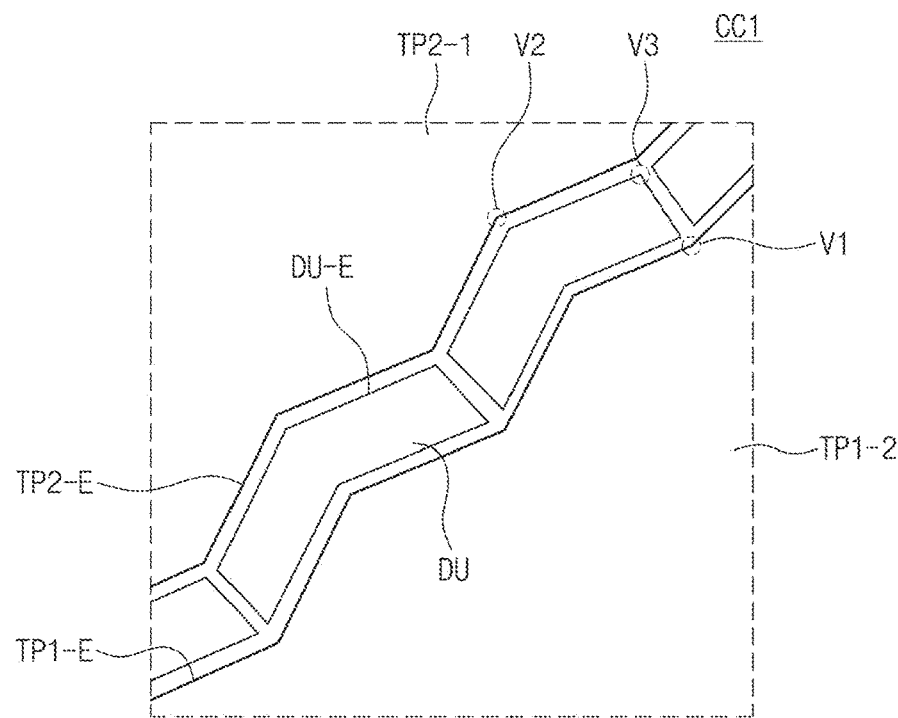
FIG. 14 and FIG. 15 are enlarged plan views showing portion "CC" of a touch sensing part of FIG. 11 according to an exemplary embodiment.
Figure 15:
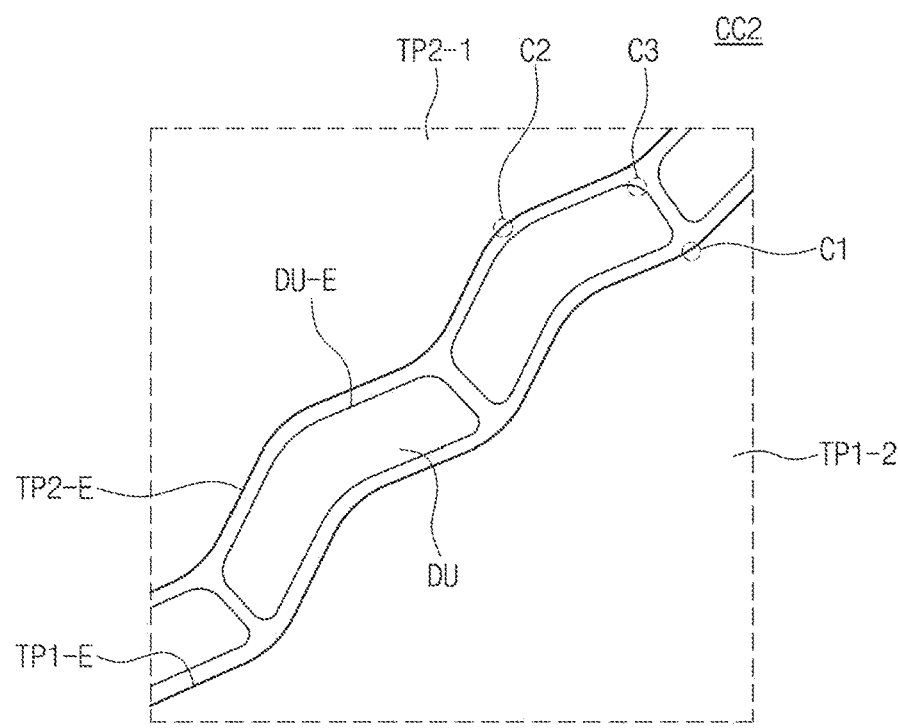

FIGS. 14 and 15 are enlarged plan views showing portion "CC" of a touch sensing part of FIG. 11 according to an exemplary embodiment. FIG. 14 is a plan view showing edges between first touch patterns TP1, second touch patterns TP2, and dummy patterns DU according to an exemplary embodiment. FIG. 15 is a plan view showing edges between first touch patterns TP1, second touch patterns TP2, and dummy patterns DU according to an exemplary embodiment.

Referring to FIG. 14, each edge TP1-E of the first touch pattern TP1-2 and each edge TP2-E of the second touch pattern TP2-1 have a zigzag shape. The dummy patterns DU are disposed between the first touch pattern TP1-2 and the second touch pattern TP2-1. The dummy patterns DU are spaced apart from the edge TP1-E of the first touch pattern TP1-2 and the edge TP2-E of the second touch pattern TP2-1. The dummy patterns DU have a zigzag shape corresponding to the zigzag shape of the first touch pattern TP1-2 and the second touch pattern TP2-1. As described above, the zigzag shape may prevent the occurrence of moiré phenomenon, which may be caused from repeated arrangement of the first touch patterns TP1 and the second touch patterns TP2.

The edge TP1-E of the first touch pattern TP1-2, the edge TP2-E of the second touch pattern TP2-1, and an edge DU-E of the dummy patterns DU each includes a plurality of straight lines and vertices V1, V2, and V3. The first touch pattern TP1-2, the second touch pattern TP2-1, and the dummy patterns DU are applied with the tensile force caused by the bending and the expansive force of the polarizing member POL. In this case, the tensile force and the expansive force may be concentrated on the vertices V1, V2, and V3. Accordingly, the crack may be easily generated at the vertices V1, V2, and V3 of the touch electrodes 110.

Referring to FIG. 15, the edge TP1-E of the first touch pattern TP1-2, the edge TP2-E of the second touch pattern TP2-1, and the edge DU-E of the dummy patterns DU include curved lines C1, C2, and C3, respectively. In detail, the vertices V1, V2, and V3 shown in FIG. 14 respectively correspond to the curved lines C1, C2, and C3 shown in FIG. 15.

When the vertices V1, V2, and V3 of the zigzag shape are modified to have the curved shape as shown in FIG. 15, the external force from the tensile force and the expansive force are distributed. In this manner, when the touch sensing part 100 is bent, an intensity of the tensile force applied to each of the curved lines C1, C2, and C3 is affected by a radius of curvature of each of the curved lines C1, C2, and C3. In detail, as the radius of curvature of each of the curved lines C1, C2, and C3 increases, the intensity of the tensile force acting on each of the curved lines C1, C2, and C3 may be decreased.

TABLE 1

| Radius of curvature (mm) | 0 (vertex) | 0.15 | 0.3 | ∞ (straight line) |
|---|---|---|---|---|
| Intensity of stress (MPa) | 170 | 161 | 160 | 158 |

Table 1 shows experimental examples representing the intensity of stress according to the radius of curvature of the curved line C1 of the first touch pattern TP1-2 and the curved line C2 of the second touch pattern TP2-1, when a constant force is applied to the touch electrodes 110.

Referring to Table 1, when the radius of curvature is zero, such as when the edge TP1-E of the first touch pattern TP1-2 and the edge TP2-E of the second touch pattern TP2-1 respectively include the vertices V1 and V2, the intensity of the stress is about 170 MPa. When the radius of curvature is 0.15 mm, the intensity of the stress is about 161 MPa. When the radius of curvature is 0.3 mm, the intensity of the stress is about 160 MPa. When the radius of curvature is infinite, such as when the edge TP1-E of the first touch pattern TP1-2 and the edge TP2-E of the second touch pattern TP2-1 have the straight line shape, the intensity of the stress is about 158 MPa.

As the radius of curvature of the curved lines C1 and C2 of the first and second touch patterns TP1-2 and TP2-1 increases, the intensity of the stress applied to the first and second touch patterns TP1-2 and TP2-1 may be decreased.

In this manner, as the radius of curvature of the curved lines C1 and C2 of the first and second touch patterns TP1-2 and TP2-1 increases, the occurrence of crack in the first and second touch patterns TP1-2 and TP2-1 may be reduced. When the first touch pattern TP1-2 and the second touch pattern TP2-1 have the straight line shape, the intensity of the stress may be the smallest, but the moiré phenomenon may occur.

Similar to the edge TP1-E of the first touch pattern TP1-2 and the edge TP2-E of the second touch pattern TP2-1, when the edge of the connection patterns CN has the curved line, the stress applied to the connection patterns CN may be distributed. Accordingly, the edge of the connection patterns CN may be formed to have the curved shape. For example, according to an exemplary embodiment, radius of curvature of each edge of the first touch patterns and second touch patterns may be at least greater than about 0.1 mm, so as to reduce the intensity of the stress and prevent the occurrence of the moiré phenomenon.

Figure 16:
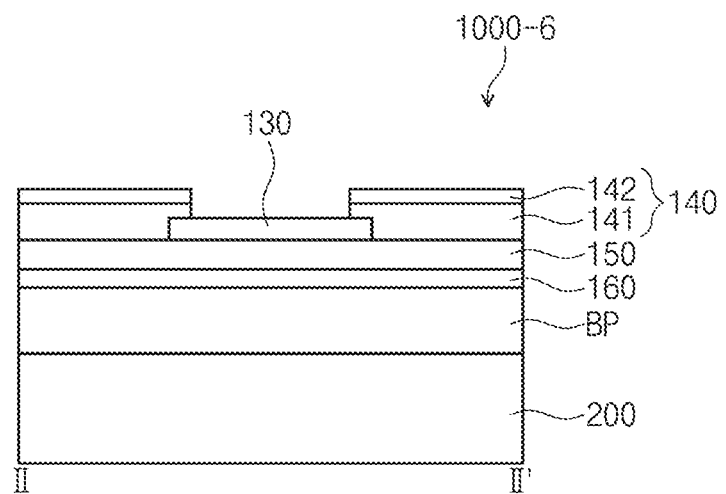
FIG. 16 and FIG. 17 are cross-sectional views taken along line II-II' of FIG. 4.
Figure 17:
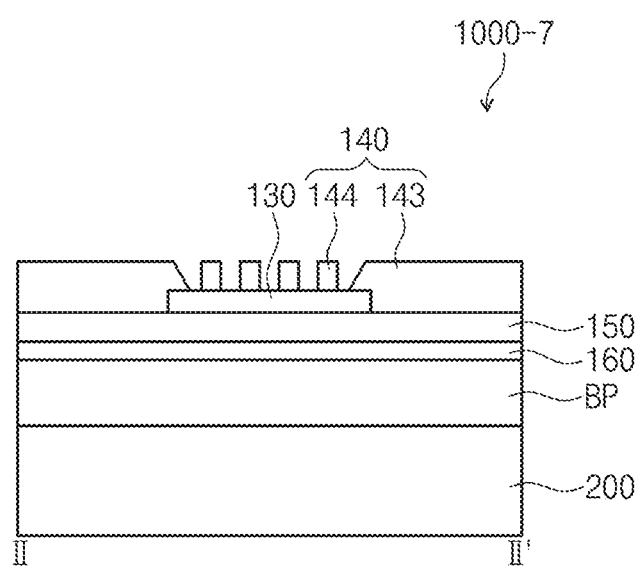

FIGS. 16 and 17 are cross-sectional views taken along line II-II' of FIG. 4 showing display apparatuses 1000-6 and 1000-7, respectively.

FIG. 16 is a cross-sectional view showing the display apparatus 1000-6 according to an exemplary embodiment. The display apparatus 1000-6 includes touch pads 130, an insulating layer 140, a protective layer 150, an adhesive 160, a base member BP, and a display panel 200. The insulating layer 140 includes a first insulating layer 141 and a second insulating layer 142.

Referring back to FIG. 4, the insulating layer 140 may be disposed to cover the entire surface of the display panel 200 except for an area in which the touch pads 130 are arranged in plan view. Referring to FIG. 16 again, the insulating layer 140 is disposed to cover the edge area of the touch pads 130. A circuit board (not shown) is disposed on and electrically connected to the exposed touch pads 130.

To form the insulating layer 140 that exposes the touch pads 130, the first insulating layer 141 and the second insulating layer 142 are coated to cover the touch electrodes 110, the touch lines 120, and the touch pads 130, and are patterned. As another example, the first and second insulating layers 141 and 142 may be coated to cover only the edge area of the touch pads 130. FIG. 16 shows that the insulating layer 140 includes the first insulating layer 141 and the second insulating layer 142 disposed on the first insulating layer 141, however, the insulating layer 140 may alternatively be formed to have only one layer.

As a step of forming the touch sensing part 100, the touch electrodes 110, the touch lines 120, the touch pads 130, and the insulating layer 140 are formed on the protective layer 150, and then the base member BP and the protective layer 150 are attached to each other using the adhesive 160. A pressure is applied to the insulating layer 140 to attach the base member BP and the protective layer 150. When viewed in plan view, as the area coated with the insulating layer 140 increases, the area applied with the pressure may be increased. In this case, the force applied to the adhesive 160 may become uniform, and thus, an adhesive effect between the protective layer 150 and the base member BP may be improved.

The insulating layer 140 may be coated only the edge area of the touch pads 130, but the adhesive 160 may move to the area where the insulating layer 140 is not coated, when the pressure is applied to the insulating layer 140. As such, a thickness of the adhesive 160 disposed under the area where the insulating layer 140 is disposed may be reduced, and thus, the adhesive effect between the protective layer 150 disposed under the insulating layer 140 and the base member BP may be reduced.

FIG. 17 is a cross-sectional view showing the display apparatus 1000-7 according to an exemplary embodiment. The display apparatus 1000-7 includes touch pads 130, an insulating layer 140, a protective layer 150, an adhesive 160, a base member BP, and a display panel 200. The insulating layer 140 includes a third insulating layer 143 and a fourth insulating layer 144.

Referring to FIG. 17, the fourth insulating layer 144 is disposed on the touch pad 130. The fourth insulating layer 144 may function as to apply a uniform pressure to the adhesive 160 disposed under the touch pads 130 when the pressure is applied to attach the protective layer 150 and the base member BP.

The fourth insulating layer 144 may have various shapes, but a sum of the thickness of the protective layer 150 and the thickness of the third insulating layer 143 may be substantially equal to a sum of the thickness of the protective layer 150, the thickness of the touch pads 130, and the thickness of the fourth insulating layer 144, to apply uniform pressure on the display apparatus 1000-7.

In FIG. 16, the touch pad 130 is shown as a single-layer structure, but the touch pads 130 may have a plurality of conductive layers including a conductive material according to an exemplary embodiment. In this case, an insulating material may be disposed between the conductive layers to apply the uniform pressure to elements disposed under the touch pads 130 as shown in FIG. 17. The thickness of the touch pads 130 including the insulating material may be substantially the same as the thickness of the insulating layer 140.

Referring to FIGS. 16 and 17, the protective layer 150 is attached to the base member BP by the adhesive 160. However, the protective layer 150 may be directly attached to the display panel 200 by the adhesive 160 without the base member BP.

Figure 18A:
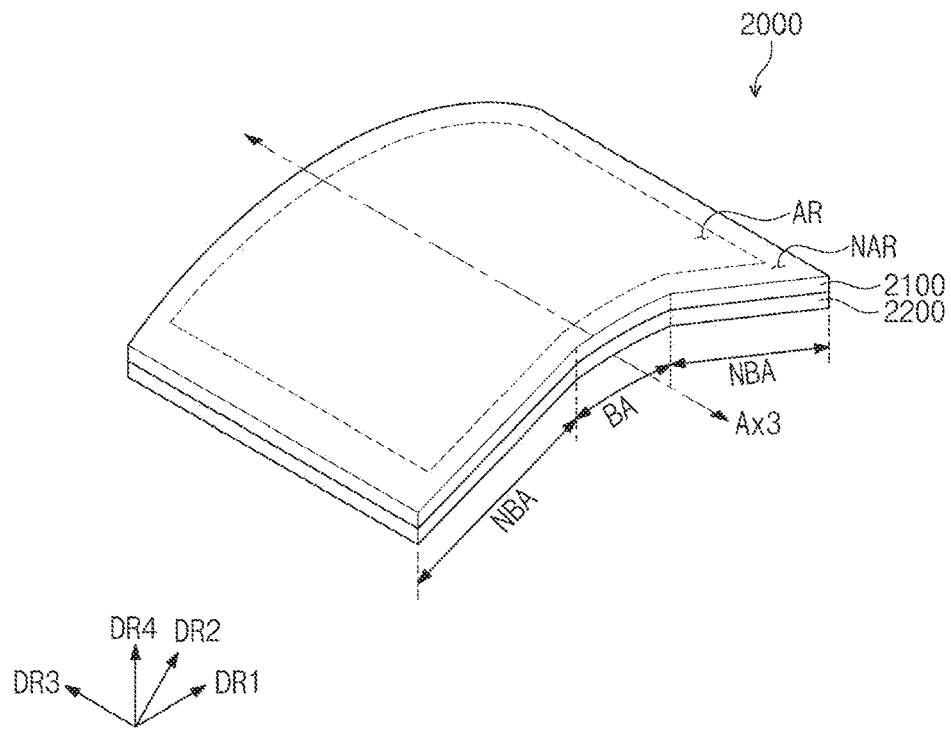
FIG. 18A and FIG. 18B are perspective views showing a display apparatus according to an exemplary embodiment.
Figure 18B:
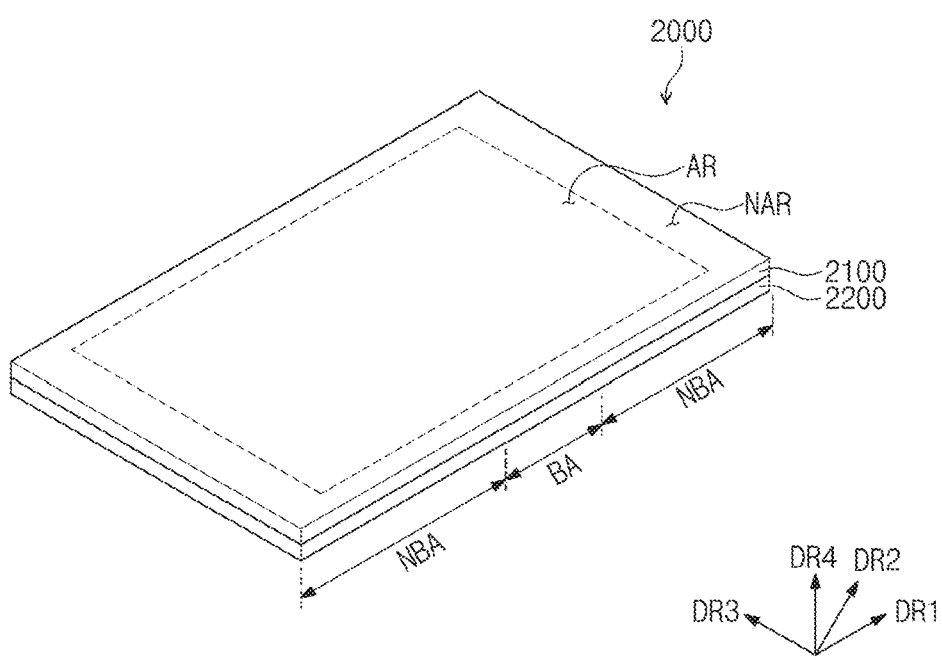

FIGS. 18A and 18B are perspective views showing a display apparatus 2000 according to an exemplary embodiment. FIG. 18A shows the display apparatus 2000 in an out-folding state, and FIG. 18B shows the display apparatus 2000 in an unfolding state.

The display apparatus 2000 includes a touch sensing part 2100 and a display panel 2200. The touch sensing part 2100 is disposed on the display panel 2200. The touch sensing part 2100 and the display panel 2200 shown in FIGS. 18A and 18B are respectively the same as the touch sensing part 100 and the display panel 200 illustrated with reference to FIG. 1, and thus, repeated descriptions thereof will be omitted.

Referring to FIG. 18A, the display apparatus 2000 includes a bending area BA bent with respect to a third reference axis Ax3 substantially parallel to a third direction DR3, and a flat area NBA disposed adjacent to the bending area BA. The third direction DR3 is perpendicular to a first direction DR1. The display apparatus 2000 includes the flat area NBA, the bending area BA, and the flat area NBA, which are sequentially arranged in the first direction DR1.

When the bending area BA is bent, a stress occurs in the bending area BA, but the stress may not occur in the flat area NBA, since the flat area NBA is not bent. The display apparatus 2000 shown in FIG. 18A is outwardly bent, i.e., the out-folding state, with respect to the third reference axis Ax3 substantially parallel to the third direction DR3, such that the touch sensing part 2100 faces the outside. It is contemplated that, however, the display apparatus 2000 may be in the in-folding state.

The display apparatus 2000 may be, but not limited to, a flexible display apparatus that may maintain the unfolding or folding state. While FIG. 18A shows that the display apparatus 2000 is folded in the third reference axis Ax3, it is contemplated that, however, the display apparatus 2000 may be folded with respect to two or more reference axes. The display apparatus 2000 may alternatively include only the bending area BA without including the flat area NBA.

Referring to FIG. 18B, the display apparatus 2000 in the unfolding state may include an active area AR and a non-active area NAR on a flat surface defined by the first direction DR1 and the third direction DR3.

According to exemplary embodiments, controlling the extension direction of the connection patterns of the touch electrode and the angle of the absorption axis may prevent or reduce cracks in the touch electrode from bending. In addition, sides of the touch electrode have a curved shape, which may prevent or reduce forming cracks therein from bending.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A display apparatus comprising:
a display panel configured to display an image;
a polarizing member disposed on the display panel and having an absorption axis and a transmission axis perpendicular to the absorption axis; and
a first touch electrode disposed on the display panel and overlapping the polarizing member, the first touch electrode extending in a first direction crossing an absorption axis direction, the absorption axis direction is parallel to the absorption axis,
wherein:
the first touch electrode comprises:
first touch patterns; and
a connection pattern connecting adjacent first touch patterns in the first direction;
the connection pattern has a minimum width in a direction perpendicular to a second direction, the second direction crossing the first direction and the absorption axis direction;
the first direction and the absorption axis direction form a first directional angle equal to or less than substantially 90 degrees;
the first direction and the second direction form a second directional angle equal to or less than substantially 90 degrees;
the second direction and the absorption axis direction form a third directional angle equal to or less than substantially 90 degrees; and
the first directional angle is the sum of the second directional angle and the third directional angle.

2. The display apparatus of claim 1, further comprising a second touch electrode disposed on the display panel, the second touch electrode extending in a third direction perpendicular to the first direction and electrically insulated from the first touch electrode,
wherein the second touch electrode comprises:
second touch patterns; and
a bridge pattern connecting adjacent second touch patterns in the third direction.

3. The display apparatus of claim 2, further comprising a protective layer disposed between the display panel and the first touch electrode,
wherein the first and second touch electrodes are disposed between the polarizing member and the protective layer.

4. The display apparatus of claim 2, further comprising a protective layer disposed between the display panel and the first touch electrode,
wherein the polarizing member is disposed between the protective layer and the display panel.

5. The display apparatus of claim 2, wherein the first directional angle is substantially 45 degrees.

6. The display apparatus of claim 2, further comprising a bending area,
wherein the display apparatus is configured to be bent in the bending area with respect to a reference axis substantially parallel to the third direction.

7. The display apparatus of claim 6, wherein the bending area is configured to be bent to have a convex shape.

8. The display apparatus of claim 2, wherein a side of the first touch patterns and a side of the second touch patterns each has a zigzag shape.

9. The display apparatus of claim 8, wherein edges of the zigzag shape each has a curved shape.

10. The display apparatus of claim 9, further comprising dummy patterns disposed between and electrically insulated from the first touch patterns and the second touch patterns,
wherein a portion of an edge of each of the dummy patterns has a curved shape.

11. A display apparatus comprising:
a display panel configured to display an image;
a polarizing member disposed on the display panel and comprising an absorption axis and a transmission axis perpendicular to the absorption axis; and
a touch electrode disposed on the display panel and overlapping the polarizing member, the touch electrode comprising a bending area configured to be bent with respect to a reference axis perpendicular to a first direction,
wherein:
the touch electrode has a minimum width in a direction perpendicular to a second direction;
the first direction, the second direction, and an absorption axis direction cross each other, the absorption axis direction is substantially parallel to the absorption axis;
the first direction and the absorption axis direction form a first directional angle equal to or less than substantially 90 degrees;
the first direction and the second direction form a second directional angle equal to or less than substantially 90 degrees;
the second direction and the absorption axis direction form a third directional angle equal to or less than substantially 90 degrees; and
the first directional angle is the sum of the second directional angle and the third directional angle.

12. The display apparatus of claim 11, wherein:
an angle between the first direction and the absorption axis direction in a counter-clock wise direction with respect to the first direction is more than substantially degrees and equal to or less than substantially 90 degrees; and
an angle between the first direction and the second direction in the counter-clock wise direction is less than the first directional angle.

13. The display apparatus of claim 12, wherein an angle between the first direction and the absorption axis direction in the counter-clockwise direction is substantially 45 degrees.

14. The display apparatus of claim 11, wherein:
an angle between the first direction and the absorption axis direction in a clockwise direction with respect to the first direction is more than substantially 0 degrees and equal to or less than substantially 90 degrees; and
an angle between the first direction and the second direction in the clockwise direction is less than the first directional angle.

15. The display apparatus of claim 14, wherein the angle between the first direction and the absorption axis direction in the clockwise direction is substantially 45 degrees.

16. A display apparatus comprising:
a display panel configured to display an image;
a first touch electrode disposed on the display panel and extending in a first direction; and
a polarizing member disposed on the display panel, the polarizing member having an absorption axis and a transmission axis perpendicular to the absorption axis,
wherein:
the first touch electrode comprises:
first touch patterns; and
a connection pattern connecting adjacent first touch patterns in the first direction and extending along a second direction crossing the first direction and the absorption axis direction;
a width of the connection pattern has a minimum width in a direction perpendicular to the second direction; and
a portion of a side of the first touch electrode has a curved shape.

17. The display apparatus of claim 16, further comprising a second touch electrode disposed on the display panel, the second touch electrode extending in a third direction perpendicular to the first direction and electrically insulated from the first touch electrode,
wherein:
the second touch electrode comprises:
second touch patterns; and
a bridge pattern connecting adjacent second touch patterns; and
a portion of an edge of the second touch patterns has a curved shape.

18. The display apparatus of claim 17, further comprising dummy patterns disposed between and electrically insulated from the first touch patterns and the second touch patterns,
wherein a portion of an edge of each of the dummy patterns has a curved shape.

19. The display apparatus of claim 17, wherein a side of the first touch patterns and a side of the second touch patterns each has a zigzag shape.

20. The display apparatus of claim 19, wherein edges of the zigzag shape each has a minimum radius of curvature equal to or greater than substantially 0.1 mm.

21. A display apparatus comprising:
a display panel configured to display an image;
a first touch electrode disposed on the display panel, the first touch electrode comprising first touch patterns and a connection pattern connecting adjacent first touch patterns; and
a polarizing member disposed on the display panel, the polarizing member having an absorption axis and a transmission axis perpendicular to the absorption axis,
wherein:
the first touch patterns extend along a first direction;
the connection pattern between the adjacent first touch patterns extends along a second direction different from the first direction; and
the second direction is formed between the first direction and a direction of the absorption axis, when the first direction, the second direction, and the direction of the absorption axis are plotted in one quadrant to cross the same origin.

22. The display apparatus of claim 21, wherein an acute angle between the first direction and the second direction is less than 45 degrees.

23. The display apparatus of claim 21, wherein the display apparatus is configured to be bent along a direction perpendicular to the first direction.

24. The display apparatus of claim 21, wherein:
the first touch patterns have a rhombus shape; and
each side of the rhombus shape comprises a zigzag shape having rounded corners.

* * * * *